US012045772B2

(12) United States Patent
Kernick et al.

(10) Patent No.: US 12,045,772 B2
(45) Date of Patent: Jul. 23, 2024

(54) AUTOMATED PRODUCT LOCKER FOR INVENTORY CONTROL

(71) Applicant: Johnson & Johnson Vision Care, Inc., Jacksonville, FL (US)

(72) Inventors: Edward R Kernick, Jacksonville, FL (US); James Scolaro, Jacksonville, FL (US); Leslie A Voss, Jacksonville, FL (US); Ahmed Tawfik, Jacksonville, FL (US); Kyungmin Andy Lee, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 16/409,903

(22) Filed: May 13, 2019

(65) Prior Publication Data
US 2020/0364648 A1 Nov. 19, 2020

(51) Int. Cl.
*G06Q 10/087* (2023.01)
*G06K 7/14* (2006.01)
(Continued)

(52) U.S. Cl.
CPC ......... *G06Q 10/087* (2013.01); *G06K 7/1408* (2013.01); *G06N 20/00* (2019.01);
(Continued)

(58) Field of Classification Search
CPC ....... G06Q 10/087; G06T 3/40; G06T 7/0002; G06K 7/1408; G07F 11/18; G06N 20/00
See application file for complete search history.

(56) References Cited

U.S. PATENT DOCUMENTS 6,352,161 B1 3/2002 Huang
6,788,997 B1 * 9/2004 Frederick ............ G06Q 10/087
700/236

(Continued)

FOREIGN PATENT DOCUMENTS

CN 1722149 A 1/2006
CN 205257175 U 5/2016
(Continued)

OTHER PUBLICATIONS

Del Carmen León-Araujo, M., Gómez-Inhiesto, E. & Acaiturri-Ayesta, M.T. Implementation and Evaluation of a RFID Smart Cabinet to Improve Traceability and the Efficient Consumption of High Cost Medical Supplies in a Large Hospital. J Med Syst 43, 178 (2019). https://doi.org/10. 1007/s10916-019-1269-6 (Year: 2019).*
(Continued)

*Primary Examiner* — Allen C Chein
*Assistant Examiner* — Aaron N Tutor
(74) *Attorney, Agent, or Firm* — Kristina Okafor

(57) ABSTRACT

An automated product locker includes a housing and a drawer configured to be slidably stowable within the housing. The defines a storage area for storing product. Visual indicators on the product locker indicate respective positions, i.e., locations of the product within the storage area, so that desired products may located by the user. Upon withdrawal or closure of a door by a user, a machine vision system, such as a camera, may capture information about the product and inventory the product based, at least in part, on the information identified from images of the product obtaining by the machine vision system.

31 Claims, 18 Drawing Sheets

(51) Int. Cl.
  *G06N 20/00* (2019.01)
  *G06T 3/40* (2024.01)
  *G06T 7/00* (2017.01)
  *G07F 11/18* (2006.01)

(52) U.S. Cl.
  CPC .............. *G06T 3/40* (2013.01); *G06T 7/0002* (2013.01); *G07F 11/18* (2013.01)

(56) References Cited

U.S. PATENT DOCUMENTS

| | | | |
|---|---|---|---|
| 8,423,431 | B1 | 4/2013 | Rouaix et al. |
| 9,122,999 | B2* | 9/2015 | Jackson ................ G06T 7/0008 |
| 10,632,046 | B2* | 4/2020 | Ahmadi ................ A61J 7/0418 |
| 2003/0031601 | A1 | 2/2003 | Gebrian et al. |
| 2005/0192705 | A1 | 9/2005 | Pinney |
| 2010/0030371 | A1 | 2/2010 | Chudy et al. |
| 2011/0012735 | A1 | 1/2011 | Kestenbaum |
| 2011/0127351 | A1 | 6/2011 | Lee |
| 2014/0297027 | A1 | 10/2014 | Tylenda |
| 2014/0316916 | A1* | 10/2014 | Hay ....................... G06Q 20/20 705/17 |
| 2016/0098831 | A1 | 4/2016 | Glickman et al. |
| 2016/0210439 | A1 | 7/2016 | Hartlaub et al. |
| 2016/0307150 | A1 | 10/2016 | Rogers et al. |
| 2017/0103363 | A1 | 4/2017 | Boukhny et al. |
| 2017/0249491 | A1* | 8/2017 | Macintosh ........... G06K 7/1456 |
| 2018/0095138 | A1 | 4/2018 | Newport et al. |
| 2018/0319590 | A1 | 11/2018 | Lindbo et al. |
| 2018/0336687 | A1 | 11/2018 | Mudretsov et al. |
| 2019/0311316 | A1 | 10/2019 | Kernick et al. |
| 2020/0125854 | A1* | 4/2020 | Seres ................... G06Q 10/087 |
| 2020/0226545 | A1 | 7/2020 | Reid |
| 2020/0253679 | A1* | 8/2020 | Mann ..................... A61B 50/10 |
| 2020/0364650 | A1 | 11/2020 | Kernick et al. |

FOREIGN PATENT DOCUMENTS

| | | |
|---|---|---|
| CN | 205594642 U | 9/2016 |
| CN | 208689650 U | 4/2019 |
| JP | 2010073152 A | 4/2010 |
| JP | 2013191142 A | 9/2013 |
| RU | 155318 U1 | 9/2015 |
| WO | WO2010/017528 A2 | 2/2010 |
| WO | 2012151425 A1 | 11/2012 |
| WO | 2020230050 A1 | 11/2020 |
| WO | 2021064691 A1 | 4/2021 |

OTHER PUBLICATIONS

PCT Written Opinion for Application No. PCT/IB2020/054528 date of Written Opinion dated Aug. 10, 2020.
PCT Written Opinion for Application No. PCT/IB2020/59292 dated Jan. 12, 2021.

* cited by examiner

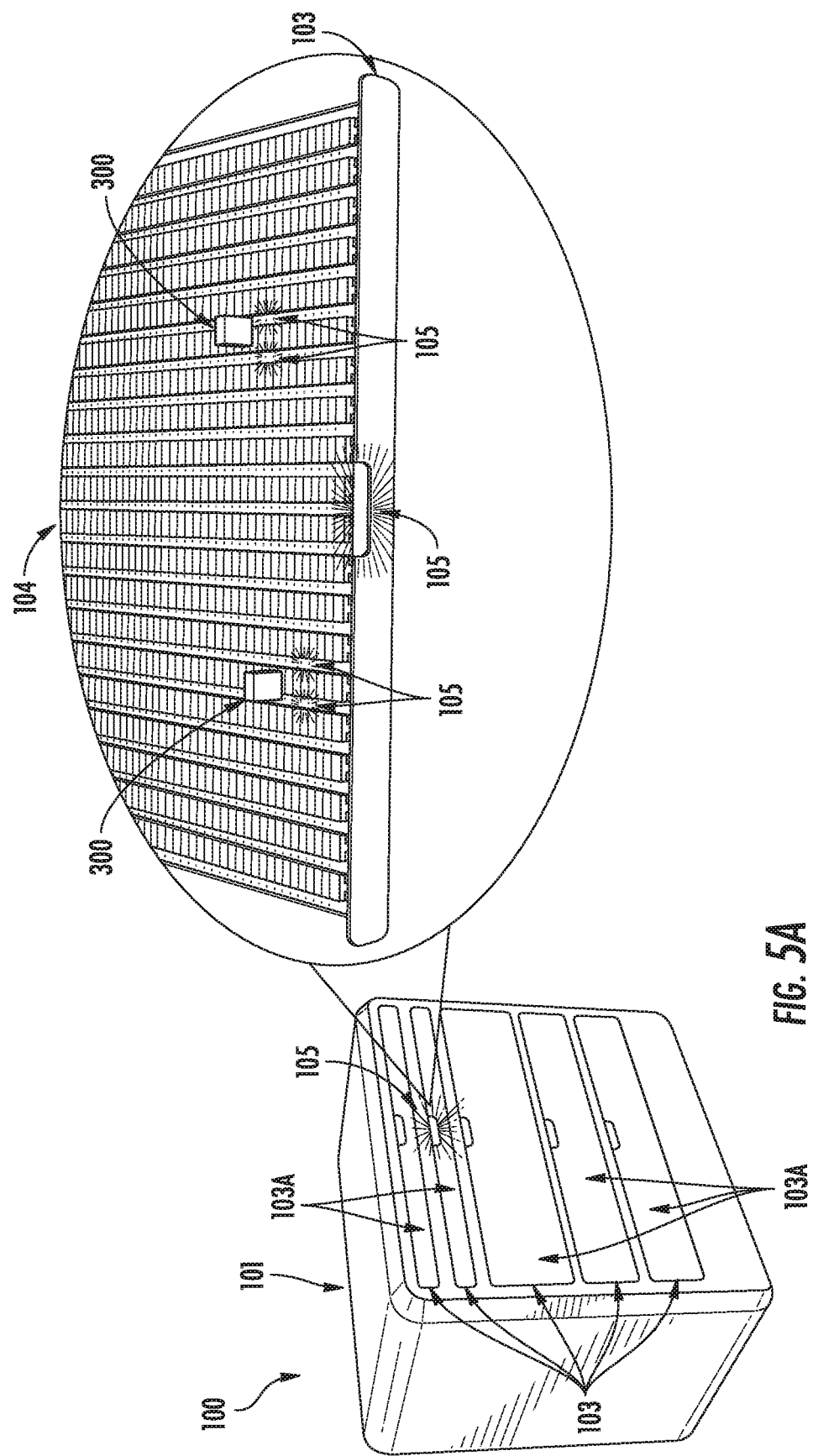

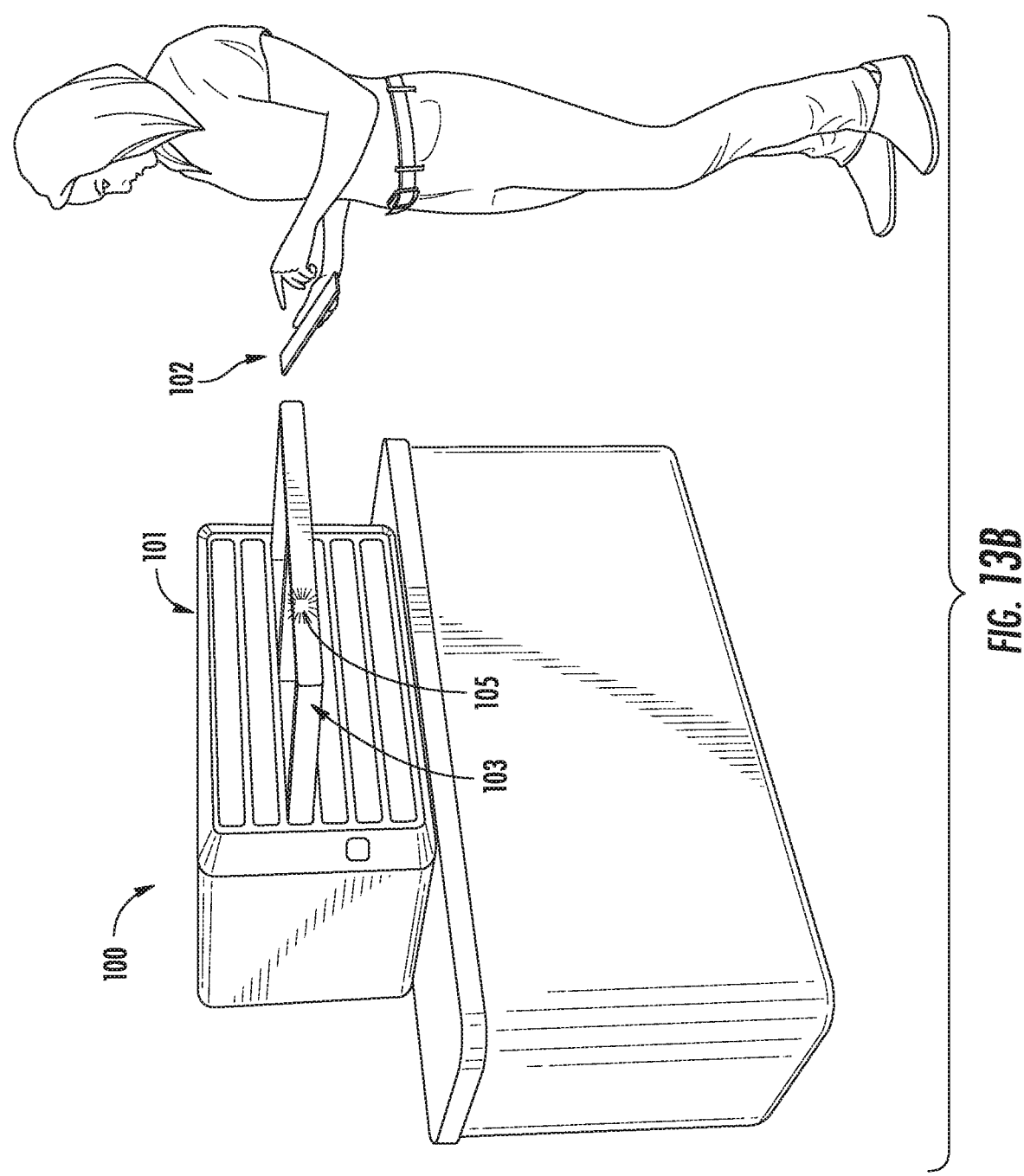

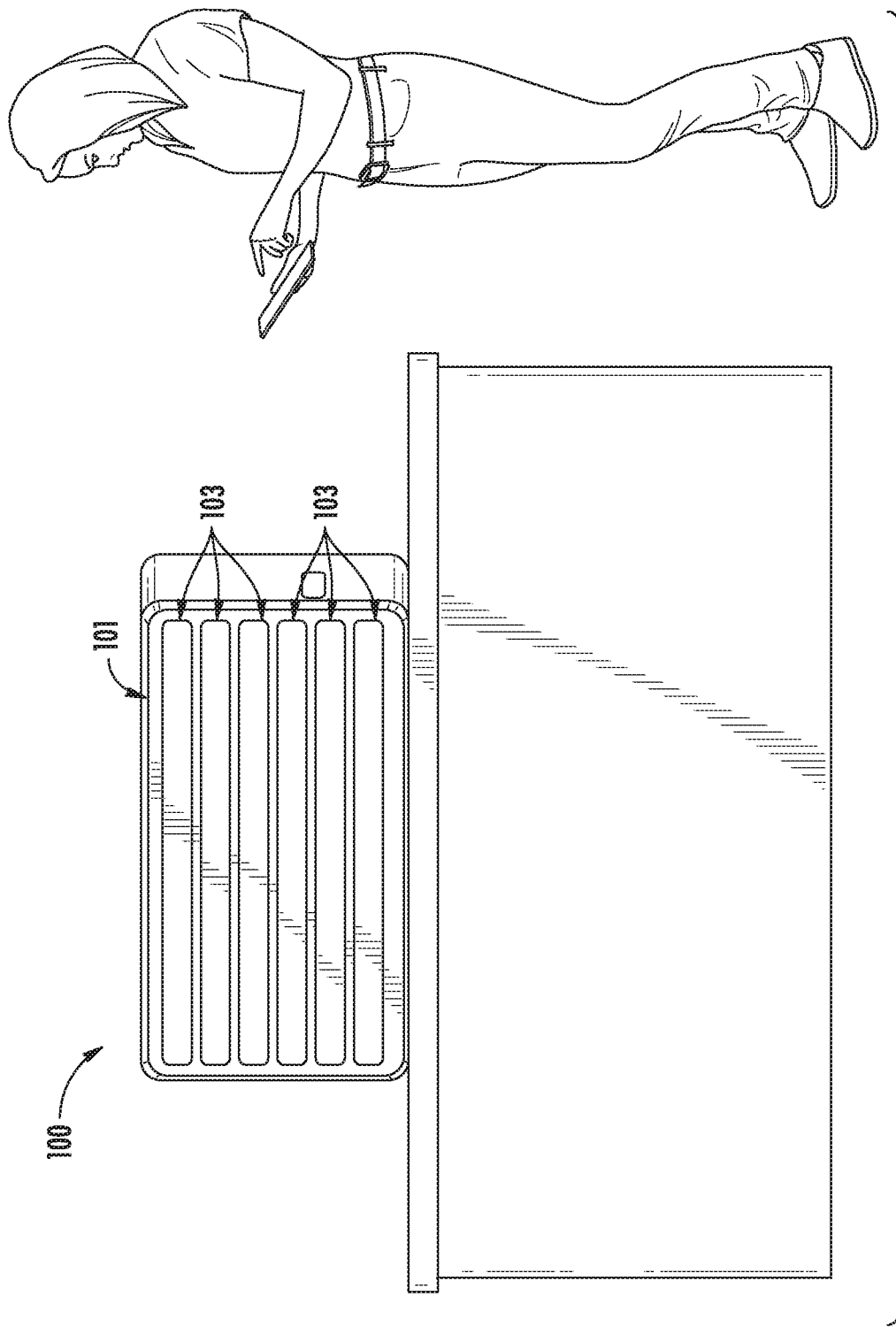

AUTOMATED PRODUCT LOCKER FOR INVENTORY CONTROL

BACKGROUND

The present disclosure relates to automated product lockers for ophthalmic lenses, and more particularly to systems to dispense ophthalmic objects, record and track patient information, determine different lenses for patients, and to track and control inventory of ophthalmic lenses in the offices of eye care professionals.

In a typical office of an eye care professional, or ECP, many different ophthalmic lenses are kept in inventory in order to dispense to a patient that enters the office. Typically, a patient will have his or her eyes examined to determine if corrective lenses are necessary and, if so and if the patient desires contact lenses, for example. In order to dispense such lenses, the ECP will keep many lenses in stock in the office in order to first test whether a specific lens is appropriate and to give the patient a sufficient quantity until a complete order can be sent.

Manual and automated dispensing machines are known and utilized for dispensing a wide variety of items ranging from snacks and hot meals to health-related items such as certain over-the-counter medications. The vast majority of these dispensing machines are vending machines that are utilized as point of sale devices. While dispensing and vending machines are utilized in many areas, they are not widely used in the health care market. In the field of eye care, for example, eye care professionals still dispense trial contact lenses from drawers manually stocked by themselves and sales representatives of the lens manufacturers. These drawers require manual inventory control and simply hold the contact lenses. Further, there is a need to develop a system for stocking the lenses manually. Different stock keeping units, or SKUs, need to be segregated by attributes such as refractive power; wear regimen such as daily, weekly, bi-weekly or monthly wear; lens manufacturer; and lens material. This necessarily requires the use of many drawers that are not completely full in order to keep track of what is in inventory and to more easily locate a lens of choice when a physician selects for a patient.

There exists a need, however, for systems that may be utilized by eye health care professionals as a tool to assist such professionals with a means and method for providing the patient with real time access to a wide variety of contact lenses in a timely manner. Such machines could also be used to better manage the large number of lenses and growing number of SKUs that need to be kept in stock with automated inventory control. Such machines and systems would also be used by manufacturers of such lenses to provide immediate access to those lenses which fit the needs of each particular, individual patient. In addition, the system can deliver product information to conduct data analytics to better provide new products that better meet such patients' needs.

Embodiments of the present disclosure provide devices and methods that address the above clinical needs.

SUMMARY

An example automated product locker is described herein. The automated product locker can include a housing and a drawer configured to be slidably stowable within the housing. The drawer can define a storage area configured to receive a product (e.g., packages containing one or more contact lenses). The automated product locker can also include a plurality of visual indicators configured to indicate respective positions of respective units of the product within the storage area, and a machine vision system arranged within the housing and configured to capture information about the product. The machine vision system can include an optical device. Additionally, the automated product locker can include a controller arranged within the housing and operably coupled to the machine vision system. The controller can include a processor and a memory. The controller can be configured to inventory the product based, at least in part, on the information about the product, and cause one or more of the visual indicators that are associated with a desired unit of the product to actuate.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 5A-5B illustrate the automated product locker according to an implementation described herein. FIG. 5A is an isometric view illustrating the automated product locker with an enlargement window illustrating the storage area of a drawer. FIG. 5B illustrates an isometric view illustrating a portion of one of the drawers shown in FIG. 5A.

FIGS. 8A-8C illustrate different drawer configurations, respectively.

FIG. 11A illustrates a view from the front of the automated product locker without the side panel. FIG. 11B illustrates a view from the side of the automated product locker without the side panel.

FIGS. 13A-13D illustrate an example process using the automated product locker according to an implementation described herein.

DETAILED DESCRIPTION

Figure 1:
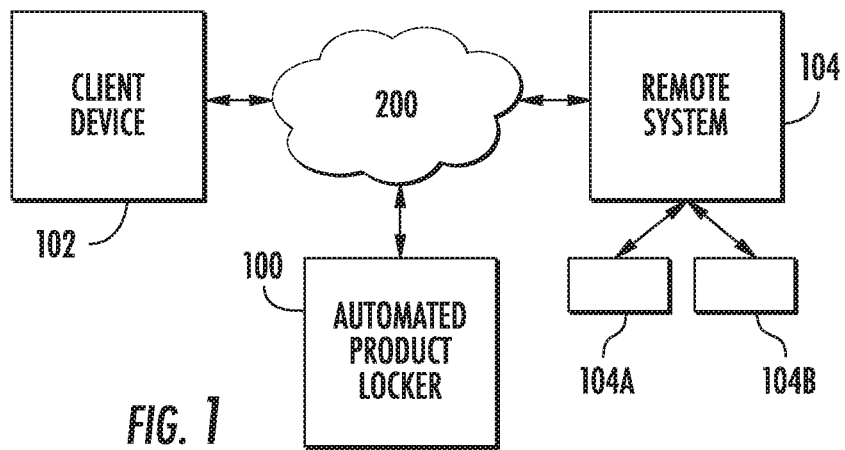
FIG. 1 is an example operating environment for the implementations described herein.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one embodiment", "certain embodiments", some "embodiments" or "an embodiment", indicate that the embodiment(s) described may include a particular feature or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. For purposes of the description hereinafter, the terms "upper", "lower", "right", "left", "vertical", "horizontal", "top", "bottom", and derivatives thereof shall relate to the invention, as it is oriented in the drawing figures. The terms "overlying", "atop", "positioned on" or "positioned atop" means that a first element, is present on a second element, wherein intervening elements interface between the first element and the second element. The term "direct contact" or "attached to" means that a first element, and a second element, are connected without any intermediary element at the interface of the two elements.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for an automated product locker for storing contact lenses, it will become evident to those skilled in the art that the implementations are not limited thereto, but are applicable for automated product lockers for storing other types of products.

Automated product storage lockers are described herein. Such automated product lockers can be used to track/inventory product such as contact lenses. For example, the automated product lockers described herein are capable of: (i) keeping track of units of product removed from storage, (ii) informing the user of stocking needs, (iii) automatically placing orders for product, (iv) including storage space for all regularly prescribed lenses, and/or (v) working during power outages.

Referring now to FIG. 1, an example operating environment for the implementations described herein is shown. As shown in FIG. 1, an automated product locker 100, a client device 102, and a remote system 102 can be operably coupled by one or more networks 200. The automated product locker 100 is described in detail below. Additionally, the client device 102 can be a computing device (e.g., computing device 700 of FIG. 14) such as a laptop computer, desktop computer, tablet computer, or mobile phone, and the remote system 104 can be a computing device (e.g., computing device 700 of FIG. 14) such as a server. Optionally, in some implementations, the remote system 104 is a cloud-based system, e.g., one or more computer system resources such as processors and data storage devices that are allocated to serve the needs of the client device 102 on demand. Cloud-based systems are known in the art and not described in further detail below. In some implementations, the remote system 104 can include or access a database 104A. Alternatively or additionally, the remote system 104 can include or access electronic medical records (EMRs) 104B.

As discussed above, the automated product locker 100, client device 102, and remote system 104 discussed above can be connected by one or more networks 200. This disclosure contemplates that the networks 200 are any suitable communication network. The networks can be similar to each other in one or more respects. Alternatively or additionally, the networks can be different from each other in one or more respects. The networks 200 can include a local area network (LAN), a wireless local area network (WLAN), a wide area network (WAN), a metropolitan area network (MAN), a virtual private network (VPN), etc., including portions or combinations of any of the above networks. The automated product locker 100, client device 102, and remote system 104 can be coupled to the networks 200 through one or more communication links. This disclosure contemplates the communication links are any suitable communication link. For example, a communication link may be implemented by any medium that facilitates data exchange including, but not limited to, wired, wireless and optical links. Example communication links include, but are not limited to, a LAN, a WAN, a MAN, Ethernet, the Internet, or any other wired or wireless link such as WiFi, WiMax, 3G, 4G, or 5G.

This disclosure contemplates that the automated product locker 100, client device 102, and remote system 104 can interact to carryout the inventory and shipment/distribution functionalities as described in U.S. Ser. No. 16/222,819 filed Dec. 17, 2018, and titled "DISTRIBUTION AND INVENTORY SYSTEM AND METHODS OF USING THE SAME," the disclosure of which is expressly incorporated herein by reference in its entirety. For example, as described below, the remote system 104 can manage/maintain a database 104A reflecting the inventory of product (e.g., contact lenses) stored in the automated product locker 100. By exchanging messages over the networks 200, the remote system 104 can receive messages with product inventory updates from the automated product locker 100. The remote system 104 can also query the database 104A in response to requests from the automated product locker 100 and/or the client device 102. This disclosure contemplates that a user (e.g., a healthcare professional such as an eye care professional (ECP)) can interact with the automated product locker 100 and/or the remote system 104 using the client device 102. For example, the client device 102 can run an application and/or interface with the automated product locker 100 and/or the remote system 104 using a web browser.

Figure 2:
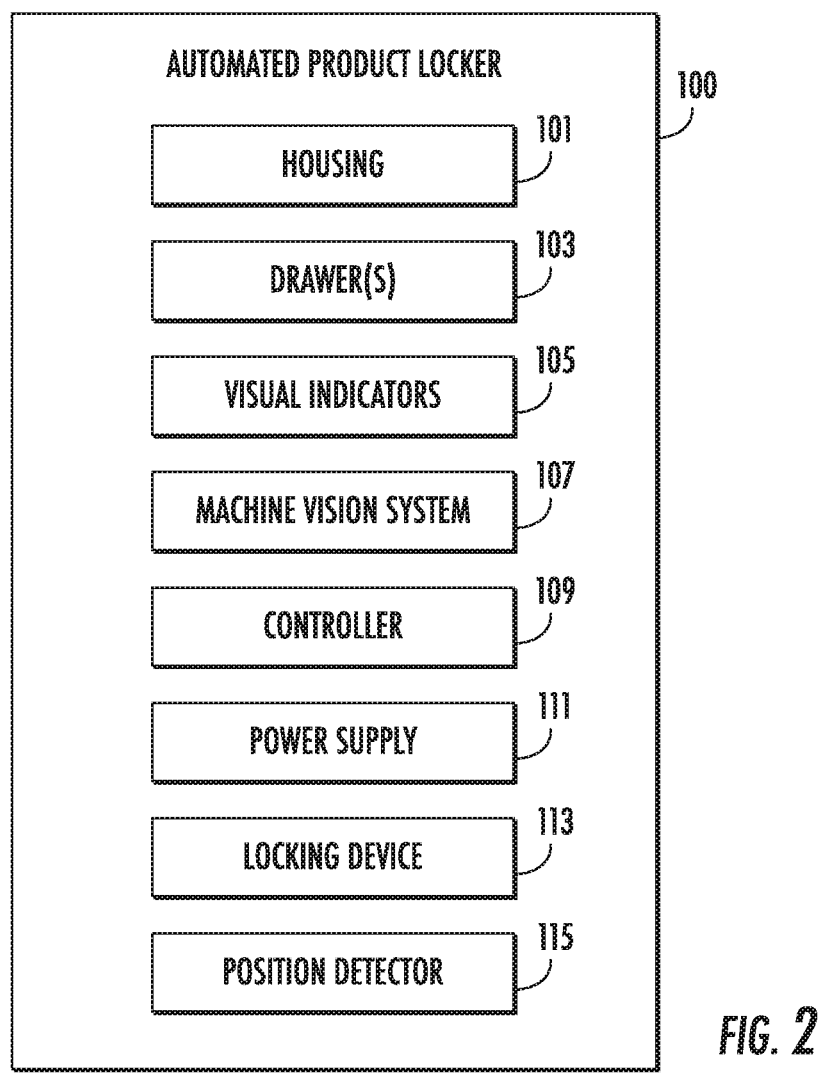
FIG. 2 is a block diagram of the automated product locker according to implementations described herein.
Figure 4:
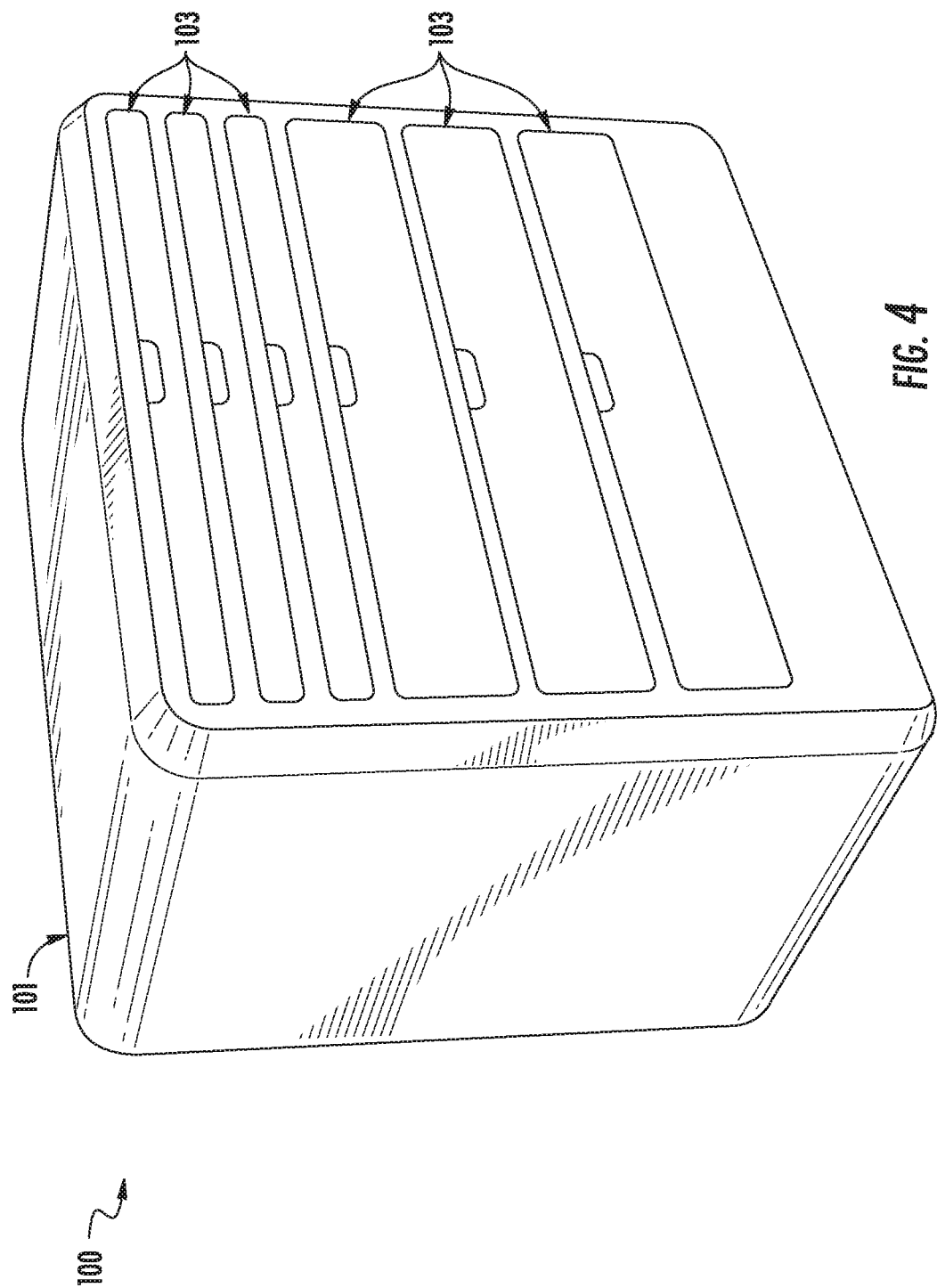
FIG. 4 is an isometric view of the automated product locker according to an implementation described herein.
Figure 5B:
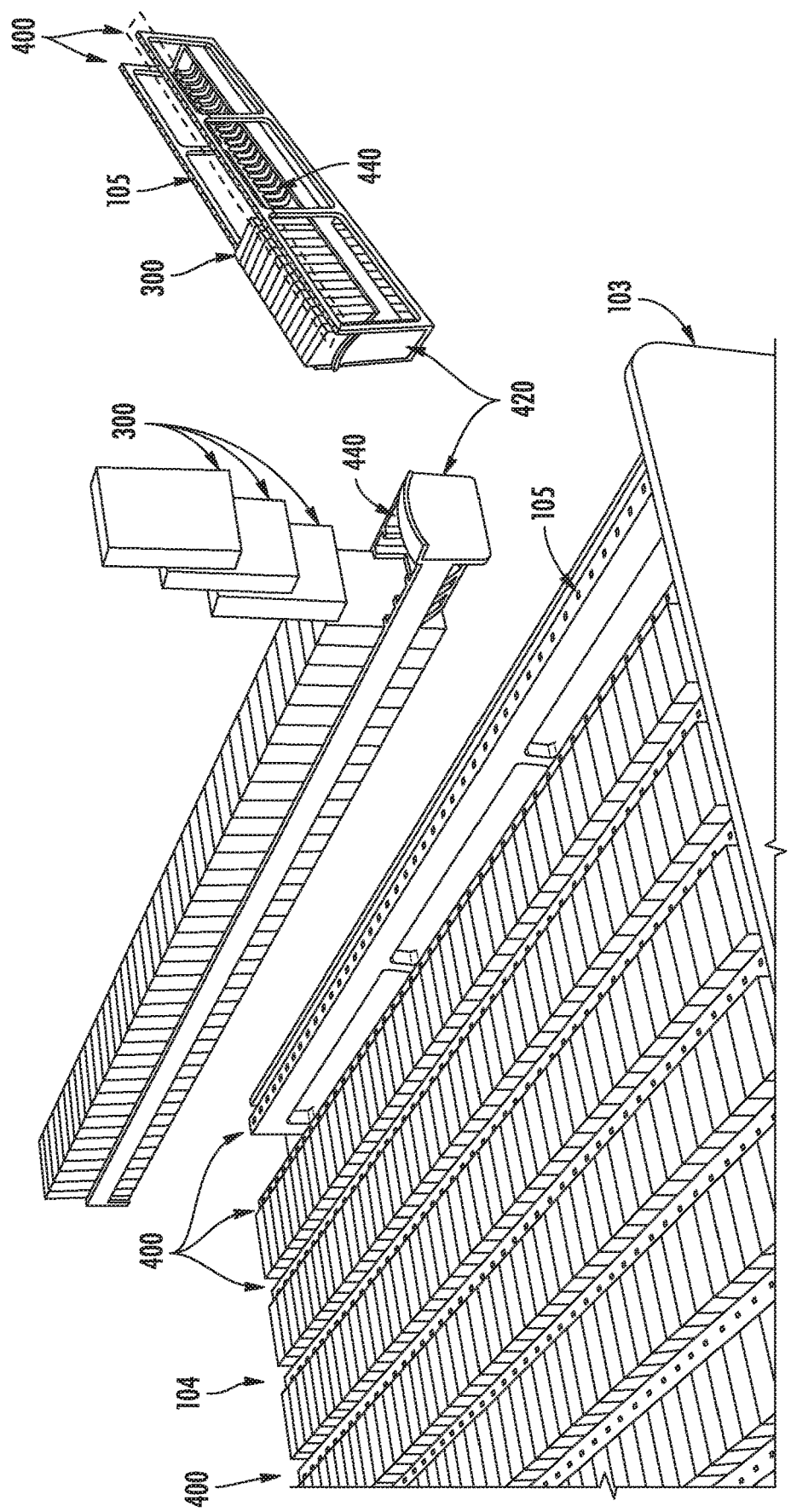
Figure 7:
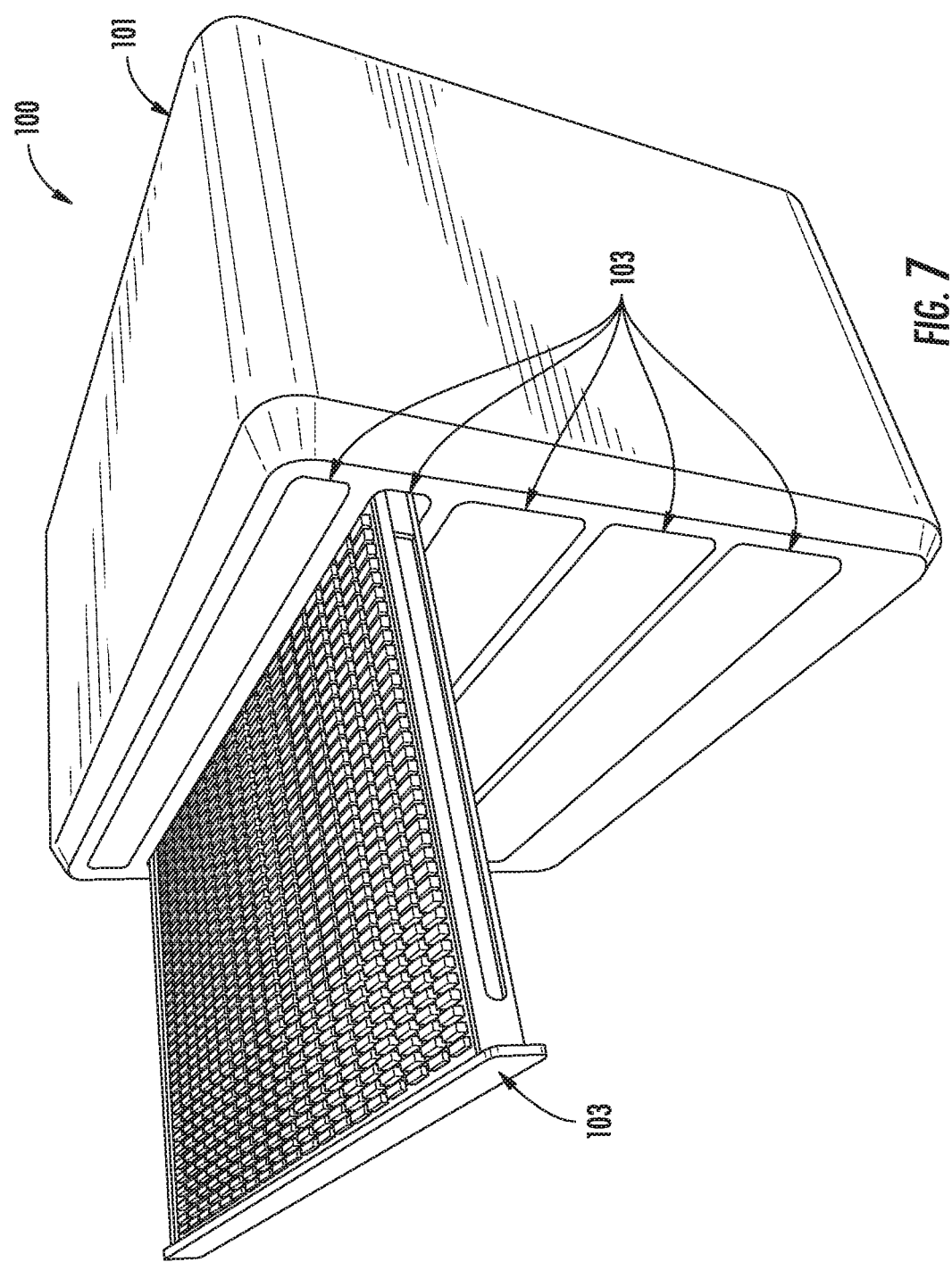
FIG. 7 illustrates an isometric view of the automated product locker according to an implementation described herein.
Figure 13A:
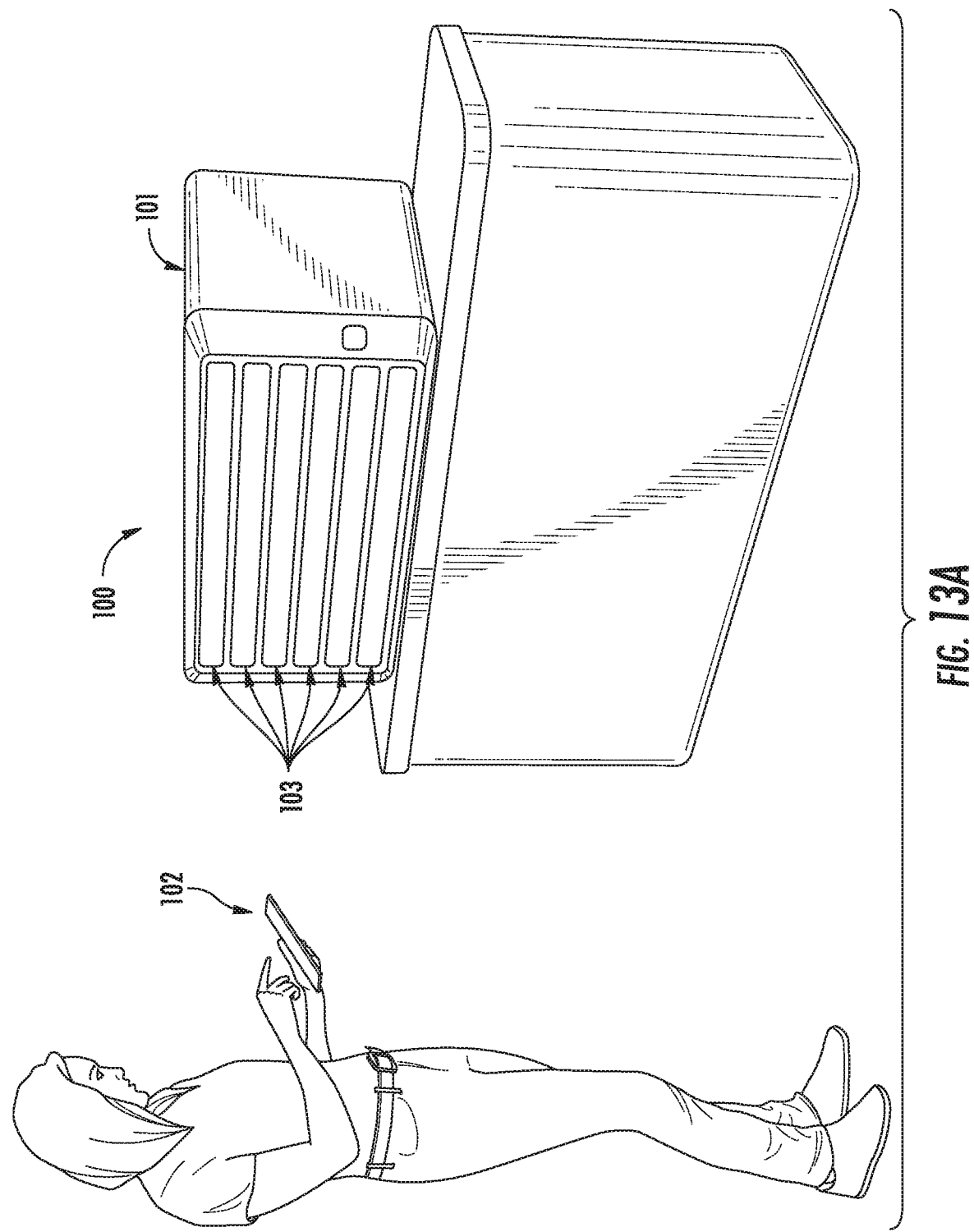
Figure 13C:
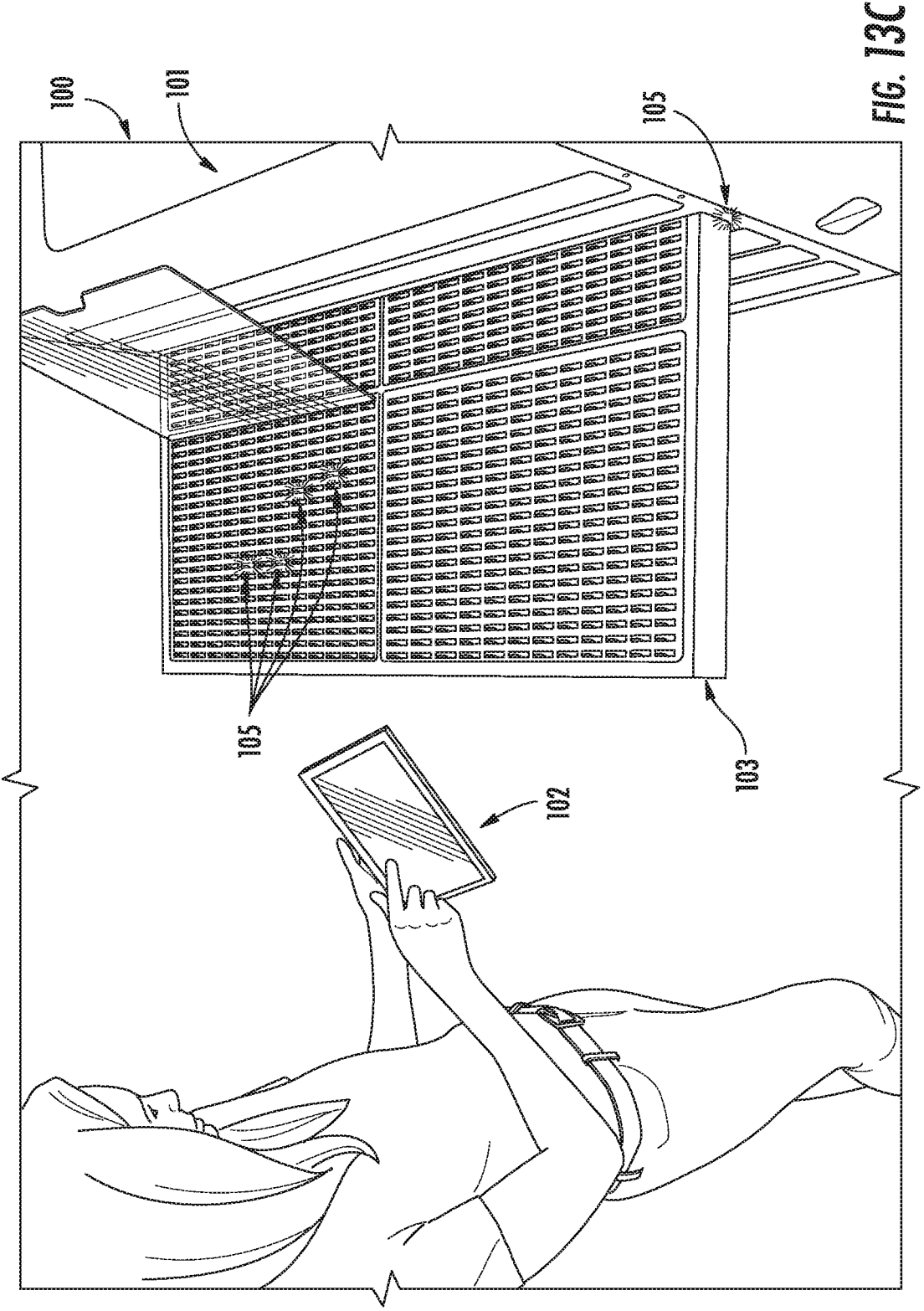

Referring now to FIG. 2, a block diagram of the automated product locker 100 according to implementations described herein is shown. The automated product locker 100 can include a housing 101 and one or more drawers 103. Each of the drawers 103 can define a storage area (e.g., storage area 104 of FIGS. 5A-5B) configured to configured to receive a product. As described herein, each of the drawers 103 is slidably stowable within the housing 101. In other words, a drawer 103 can be withdrawn from the housing 101 (e.g., as shown by FIGS. 7, 13B, 13C), for example, to provide access to the product. On the other hand, a drawer 103 can be stowed in the housing 101 (e.g., as shown by FIGS. 4, 5A, 13A).

The automated product locker 100 can also include a plurality of visual indicators 105 configured to indicate respective positions of respective units of the product within the storage area. Additionally, the automated product locker 100 can include a machine vision system 107 arranged within the housing 101 and configured to capture information about the product. The machine vision system 107 can include an optical device. Additionally, the automated product locker 100 can include a controller 109 arranged within the housing 101. The controller 109 can be a computing device (e.g., computing device 700 of FIG. 14). One example controller for use the automated product locker 100 is RASPBERRY PI of the Raspberry Pi Foundation, United Kingdom.

This disclosure contemplates that the machine vision system 107 and the controller 109 can be operably coupled, for example, through one or more communication links. This disclosure contemplates the communication links are any suitable communication link. Additionally, the visual indicators 105 and the controller 109 can be operably coupled, for example, thorough one or more communication links. For example, a communication link may be implemented by any medium that facilitates data exchange including, but not limited to, wired, wireless and optical links. This allows the controller 109 to exchange data with the machine vision system 107 and/or the visual indicators 105.

Optionally, in some implementations, the automated product locker 100 can include a power supply 111 arranged in the housing 101. For example, the automated product locker 100 can be configured to connect to grid power (e.g., standard alternating current (A/C) power delivered to homes/businesses) during normal operation. This disclosure contemplates that the power supply 111 can deliver electrical power to the automated product locker 100 in response to disruption (e.g., power outages). The power supply 111 can optionally be a battery.

Optionally, in some implementations, the automated product locker 100 can include a locking device 113 arranged in the housing 101 and configured to secure the drawer 103. For example, the locking device 113 can be an electronic lock, which secures the drawer 103 with a release mechanism operable with a passcode, keycard, radio-frequency identification (RFID), or biometrics (e.g., authentication). It should be understood that the client device 102 can send the authentication information to the automated product locker 100 via the networks. Authentication can be performed locally at the automated product locker 100 and/or remotely at a remote system. Alternatively, the locking device 113 can be a mechanical lock, which secures the drawer 103 with a release mechanism operable with a physical key.

Optionally, in some implementations, the automated product locker 100 can be configured to detect movement of the drawer 103. As described below, the machine vision system 107 can be initiated in response to movement of the drawer 103. In some implementations, the controller 109 can be configured to detect movement of the drawer 103 using the machine vision system 107. For example, the automated product locker 100 can include a position strip including machine readable code arranged within the drawer 103. The position strip can be arranged along or adjacent to one or more of the partitions (e.g., partitions 400 in FIGS. 5A-5B). It should be understood that a machine readable position code can be provided corresponding to each slot in the drawer that receives a unit of product. In this implementation, the machine vision system 107 (e.g., an imaging device or barcode scanner) can be configured to read/decode the position strip. This information can be transmitted to and received by the controller 109, which can be configured to detect the movement of the drawer 103 based on the same. Alternatively or additionally, the automated product locker 100 can further include a position detector 115 configured to sense a position of the drawer 103 relative to the housing 101. For example, the position detector 115 can be a through-beam photoelectric sensor. In this implementation, a plate with through-holes can be provided in the automated product locker 100. As a drawer 103 moves relative to the housing 101, the light beam translates over the plate, and the photoelectric sensor detects when the light beam passes through each of the through-holes. This information can be transmitted to and received by the controller 109, which can be configured to track the relative position drawer 103. Optionally, the automated product locker 100 can include drawer dampeners to stabilize the speed at which the drawers slide into/out of the housing.

Figure 3C:
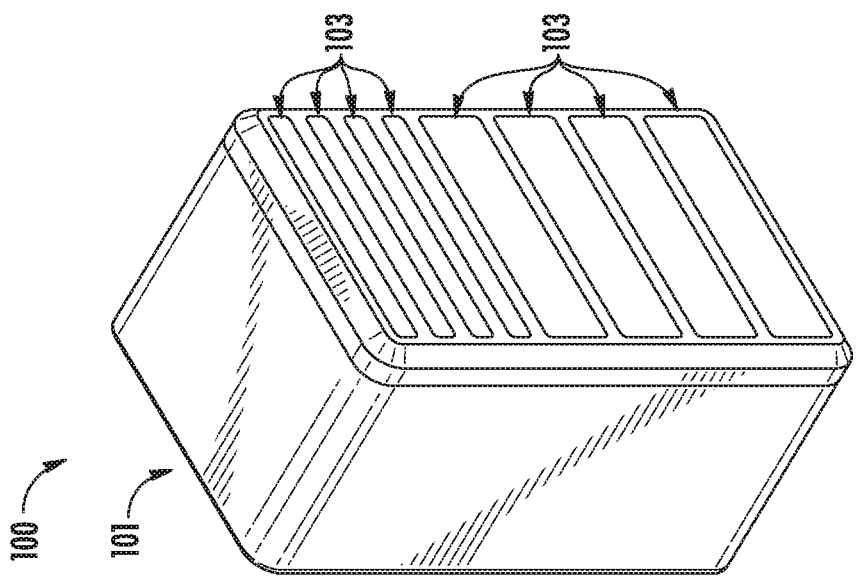
FIGS. 3A-3C are a front view (FIG. 3A), side view (FIG. 3B), and isometric view (FIG. 3C) of the automated product locker according to an implementation described herein
Figure 3B:
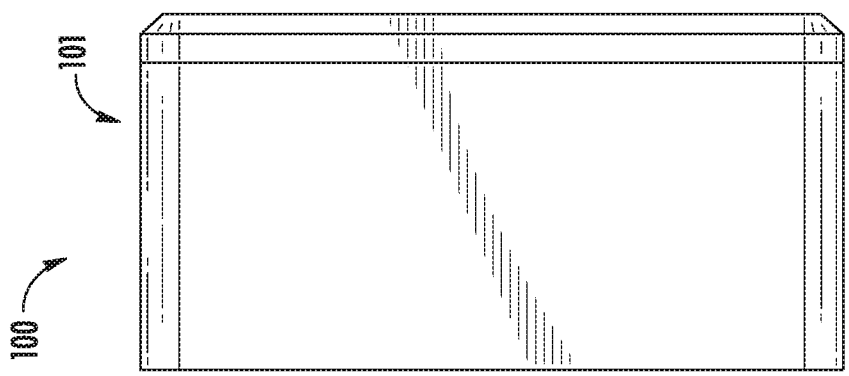
Figure 3A:
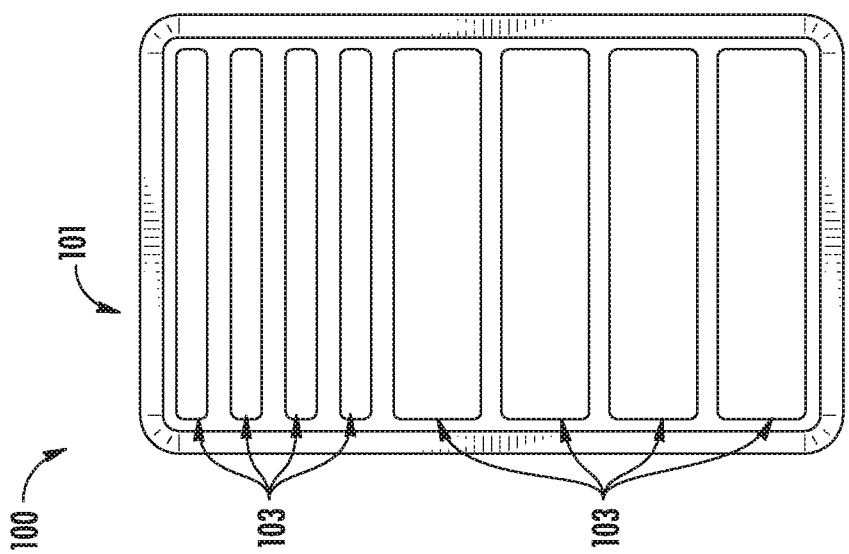

Referring now to FIGS. 3A-3C, a front view (FIG. 3A), side view (FIG. 3B), and isometric view (FIG. 3C) of the automated product locker 100 according to an implementation described herein are shown. The housing 101 and a plurality of drawers 103 are shown in FIGS. 3A-3C. The drawers 103 include four relatively small drawers (e.g., top four drawers) and four relatively larger drawers (e.g., bottom four drawers). Different sized drawers 103 can be provided to accommodate different sized product. For example, the top four drawers may be sized to accommodate one pair (1 p) contact lens packages, while the bottom four drawers may be sized to accommodate three pair (3 p) or five pair (5 p) contact lens packages. It should be understood that the number, sizes, and/or arrangement of the drawers 103 is provided only as an example and that other configurations are possible.

Referring now to FIG. 4, an isometric view of the automated product locker 100 according to an implementation described herein is shown. The housing 101 and a plurality of drawers 103 are shown in FIG. 4. The drawers 103 include three relatively small drawers (e.g., top three drawers) and three relatively larger drawers (e.g., bottom three drawers). As discussed above, different sized drawers 103 can be provided to accommodate different sized product. For example, the top three drawers may be sized to accommodate one pair (1 p) contact lens packages, while the bottom three drawers may be sized to accommodate three pair (3 p) or five pair (5 p) contact lens packages. It should be understood that the number, sizes, and/or arrangement of the drawers 103 is provided only as an example and that other configurations are possible.

The automated product locker 100 can also include visual indicators (e.g., visual indicators 105 in FIG. 2). Each of the visual indicators can be a light emitter such as a light emitting diode (LED). It should be understood that light emitters are provided only as an example. This disclosure contemplates that the visual indicators can be other elements including, but not limited to, a graphical display. As discussed above, the visual indicators (e.g., visual indicators 105 in FIG. 2) can be operably coupled to the controller (e.g., controller 109 in FIG. 2). The visual indicators are provided to notify a user (e.g., a health professional such as an eye care professional (ECP)) of the location of a desired product within the automated product locker 100. As described herein, visual indicators can be provided on external surfaces of the automated product locker 100 (e.g., on and/or adjacent to the drawers) and/or inside the storage area of the automated product locker 100 (e.g., adjacent to the product packages). The controller can transmit actuation signals to one or more of the visual indicators to notify the user where a desired product is located (e.g., which drawer and/or the position within the drawer itself). As described herein, the controller can cause one or more visual indicators on the exterior of the automated product locker 100 to actuate and/or one or more visual indicators within the drawer to actuate. In some embodiments, visual indicators may indicate errors, such as by changing colors, blinking, or otherwise changing state to alert the user of a change in status. Visual indicators may also guide the user (e.g., ECP, staff members, employees, third parties, or other users) to an available location within the locker when loading product into the locker. In certain embodiments, visual indicators may display different images, colors, or other indication to specify to whom guidance is directed. For example, each user of the device could be associated with a particular icon, graphic, or text in the case of a graphical display. Or, in the case of an LED or other light emitting visual indicator, particular users could be associated with a given color or blink sequence in the software application operatively associated with the locker so that multiple users could be directed to their desired product simultaneously by following their assigned color on the visual indicators to the correct location within the locker.

Referring now to FIGS. 5A-5B, the automated product locker 100 according to an implementation described herein are shown. FIG. 5A is an isometric view illustrating the automated product locker 100 with an enlargement window illustrating the storage area 104 of a drawer 103. The housing 101 and a plurality of drawers 103 are shown in FIG. 5A. The drawers 103 include two relatively small drawers (e.g., top two drawers) and three relatively larger drawers (e.g., bottom three drawers). As discussed above, different sized drawers 103 can be provided to accommodate different sized product. For example, the top two drawers may be sized to accommodate one pair (1 p) contact lens packages, while the bottom three drawers may be sized to accommodate three pair (3 p) or five pair (5 p) contact lens packages. It should be understood that the number, sizes, and/or arrangement of the drawers 103 is provided only as an example and that other configurations are possible.

Additionally, each of the drawers 103 shown in FIG. 5A includes a visual indicator 105 arranged on its external face 103A. In FIG. 5A, the visual indicators 105 are arranged on external faces 103A of the drawers 103 (e.g., on or near the handles of the drawers). It should be understood that the arrangement of the visual indicators 105 shown in FIG. 5A is provided only as an example. As described herein, the visual indicators 105 notify a user of the location of a desired product, so the visual indicators 105 can be placed anywhere on and/or near the drawer in order to highlight (e.g., when actuated) a particular drawer 103 for the benefit of the user. Thus, this disclosure contemplates that the visual indicators 105 can optionally be provided adjacent to the external face 103A of the drawer 103 as opposed to on the external face 103A of the drawer 103. In FIG. 5A, one of the visual indicators 105 is actuated (e.g. illuminated), i.e. the second visual indicator 105 from the top of the automated product locker 100. This informs the user that the desired product is located in this particular drawer 103.

The enlargement window in FIG. 5A illustrates the storage area 104 within the drawer 103. It should be understood that the storage area 104 receives the product. In the examples described herein, the product is contact lenses. The product can optionally be contained in one or more product packages 300 (e.g., a container such as a box, carton, wrapper, etc.). For example, a product package 300 can include one or more contact lenses. The automated product locker 100 can receive a plurality of product packages 300, i.e., a plurality of units of the product. In FIG. 5A, the product packages 300 are arranged in rows side-by-side within the storage area 104. In other words, the product packages 300 (sometimes referred to herein as "units of product") are arranged in a single row between partitions. Additionally, a set of visual indicators 105 can be provided in the storage area 104. A respective visual indicator 105 is provided adjacent to each one of the product packages 300. As shown in the enlargement window, the respective visual indicators 105 adjacent to two product packages 300 (i.e., the product packages being removed from the storage area 104) are actuated (e.g. illuminated). This informs the user that the desired product is located in these particular positions within the storage area 104.

FIG. 5B illustrates an isometric view illustrating a portion of one of the drawers 103 shown in FIG. 5A. As shown in FIG. 5B, the drawer 103 can further include a plurality of partitions 400 arranged within the storage area 104. Additionally, the drawer 103 can further include a plurality of trays 420 configured to receive the product, where each of the trays 420 is arranged between adjacent partitions 400. Each of the trays 420 can include a plurality of slots 440 for receiving units of the product (e.g., the product packages 300). As shown in FIG. 5B, a respective set of the visual indicators 105 can be arranged along each of the partitions 400. The visual indicators 105 can be arranged linearly along the partitions 400 such that one visual indicator 105 is arranged adjacent to each slot 440. In FIG. 5B, a set of visual indicators 105 is shown by the dotted box. Accordingly, a visual indicator 105 is arranged adjacent to each side of one of the product packages 300, which highlights for the benefit of the user the specific position of the desired unit of the product when actuated (e.g., illuminated).

Figure 6A:
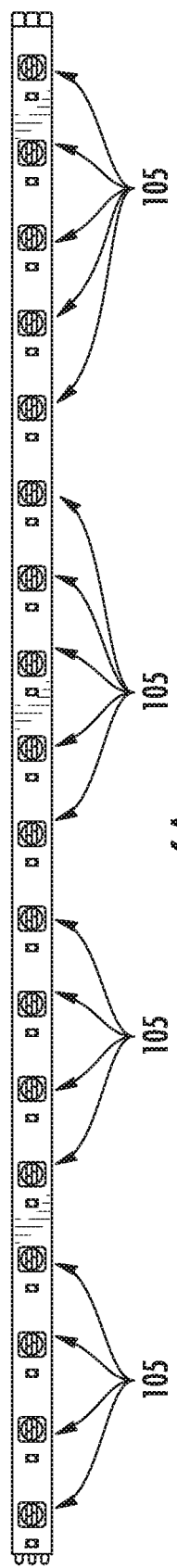
FIGS. 6A-6B are a top view (FIG. 6A) and side view (FIG. 6B) of a set of visual indicators 105 according to implementations described herein.
Figure 6B:
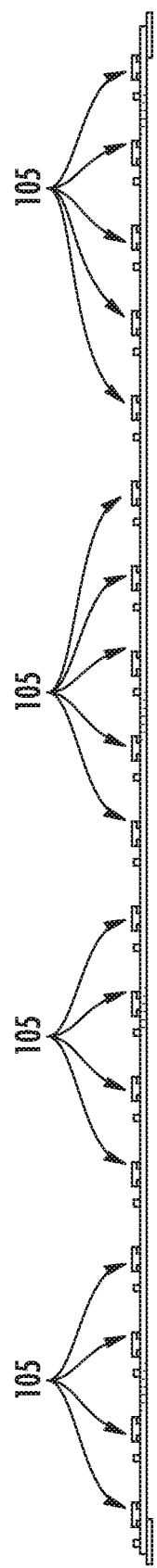

Referring now to FIGS. 6A-6B, a top view (FIG. 6A) and side view (FIG. 6B) of a set of visual indicators 105 according to implementations described herein are shown. As described herein, the set of visual indicators 105 can be arranged along a partition (e.g., partition 400 in FIG. 5B). In some implementations, the visual indicators 105 are arranged linearly along the partition. In FIGS. 6A-6B, the visual indicators 105 are arranged with equal spacing. This is because the slot sizes are the same. This disclosure contemplates that the visual indicators 105 can be arranged with unequal spacing, for example, when the slot sizes are different. In other words, the visual indictors 105 can be sized and/or spaced such that one visual indicator 105 is provided adjacent to each slot. It should be understood that the number, sizes, and/or spacing between the visual indicators 105 is provided only as an example and that other configurations are possible.

Referring now to FIG. 7, an isometric view of the automated product locker 100 according to an implementation described herein is shown. The housing 101 and a plurality of drawers 103 are shown. In FIG. 7, one of the drawers 103 is withdrawn from the housing 101, which exposes the product to the user.

Figure 8C:
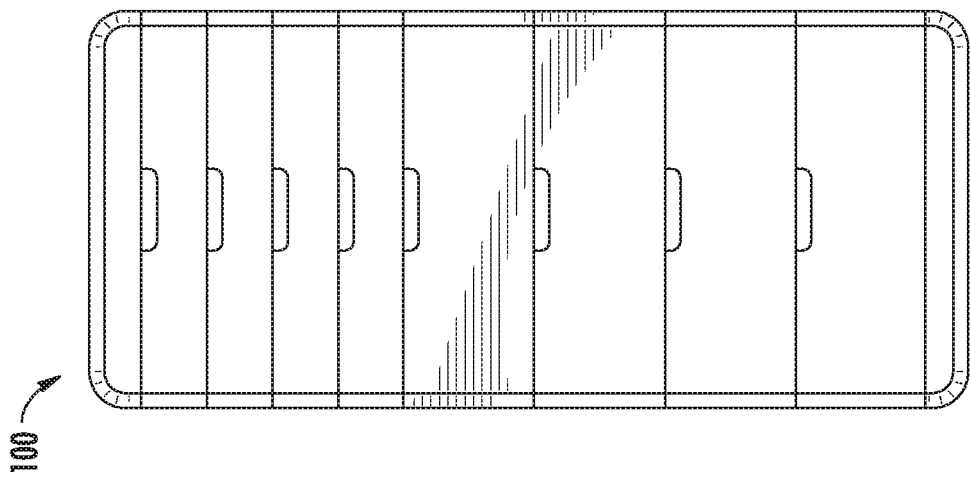
FIGS. 8A-8C are front views of the automated product locker according to implementations described herein.
Figure 8B:
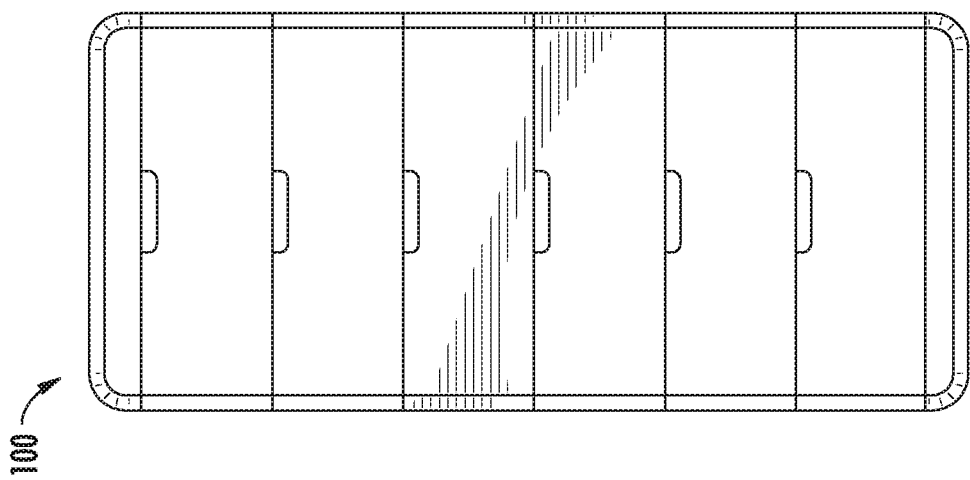
Figure 8A:
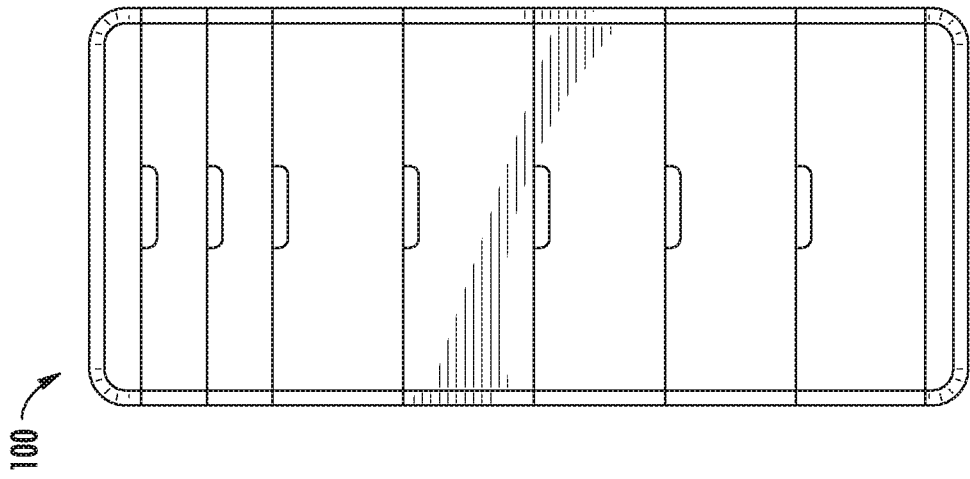

Referring now to FIGS. 8A-8C, front views of the automated product locker 100 according to implementations described herein are shown. FIGS. 8A-8C illustrate different drawer configurations. FIG. 8A illustrates a configuration with two drawers sized for one pair (1 p) contact lens packages, one drawer sized for three pair (3 p) contact lens packages, and one drawer sized for five pair (5 p) contact lens packages. FIG. 8B illustrates a configuration with six drawers sized for five pair (5 p) contact lens packages. FIG. 8C illustrates a configuration with four drawers sized for one pair (1 p) contact lens packages, one drawer sized for three pair (3 p) contact lens packages, and three drawers sized for five pair (5 p) contact lens packages. It should be understood that the number, sizes, and/or arrangement of the drawers is provided only as an example and that other configurations are possible.

Figure 9A:
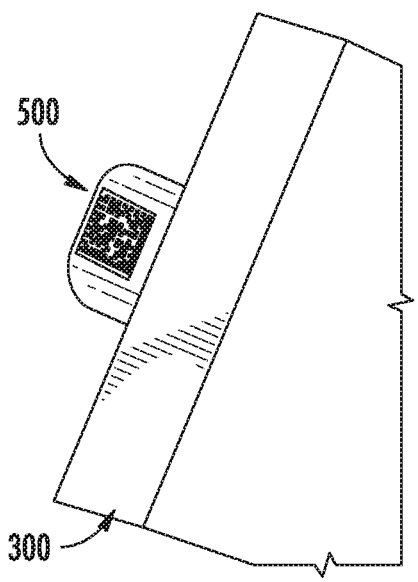
FIGS. 9A-9C illustrates example labeling included on product packages.
Figure 9B:
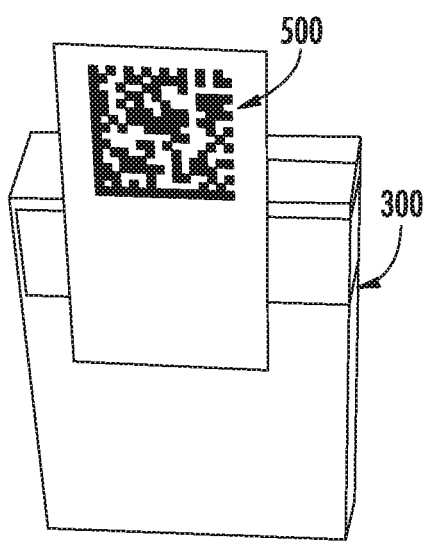
Figure 9C:
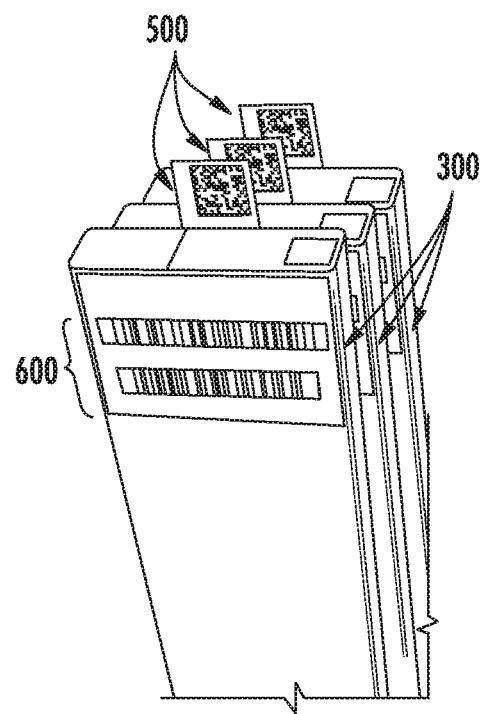
Figure 10:
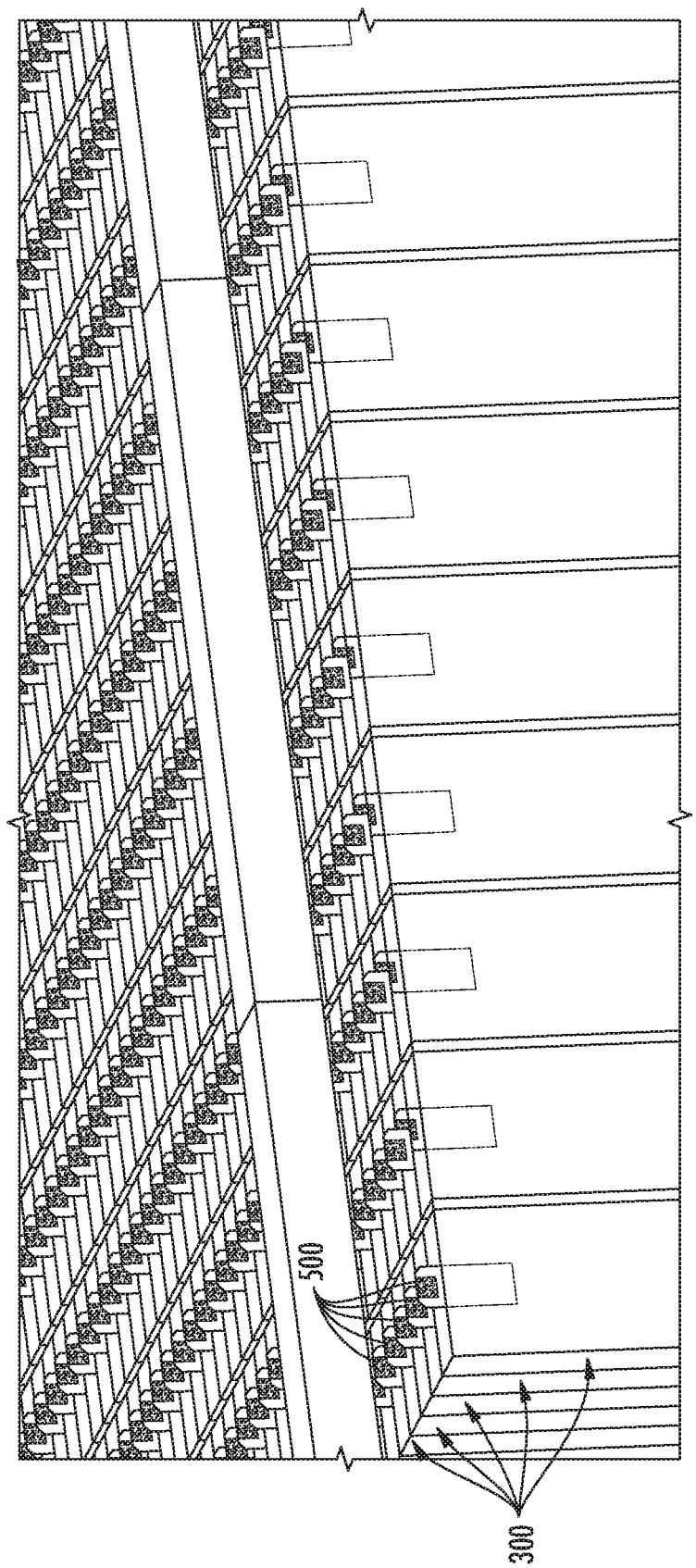
FIG. 10 illustrates a plurality of product packages, each having a label according to an implementation described herein.

As described herein, the machine vision system (e.g., machine vision system 107 of FIG. 2) can capture information about the product. This disclosure contemplates that such information can be associated with the product package and/or the product itself. For example, the product package can include a label such as a barcode (1D, 2D, or 3D), universal product code (UPC), and/or stock keeping unit (SKU). Referring now to FIGS. 9A-9C, example labeling included on the product package is shown. In some implementations, a label 500 is affixed to the product package 300 (see FIGS. 9A-9C). In FIGS. 9A-9C, the label 500 includes a 2D barcode (e.g., QR code). In some implementations, a label 600 is printed directly on the product package 300 (see FIG. 9C). In FIG. 9C, the label 600 is a UPC. In other implementations, the label can be included on and/or affixed to the product itself (not shown). Additionally, this disclosure contemplates that the information about the product can be text (e.g., brand name, product name, product description, etc.) and/or graphics (e.g., brand logo, product logo) included on and/or affixed to the product package or the product itself (see FIGS. 9B, 9C). Information associated with the product may be recognized by the computer vision system by way of a machine learning algorithm, by optical character recognition (OCR), or other means as discussed in more detail herein. This disclosure contemplates that each of the product packages stored in the automated product locker 100 can include a label. FIG. 10 illustrates a plurality of product packages 300, each having a label 500. The product packages 300 can be stored inside the automated product lockers described herein, and the machine vision system can capture information about the product by reading/decoding the labels 300.

Figure 11A:
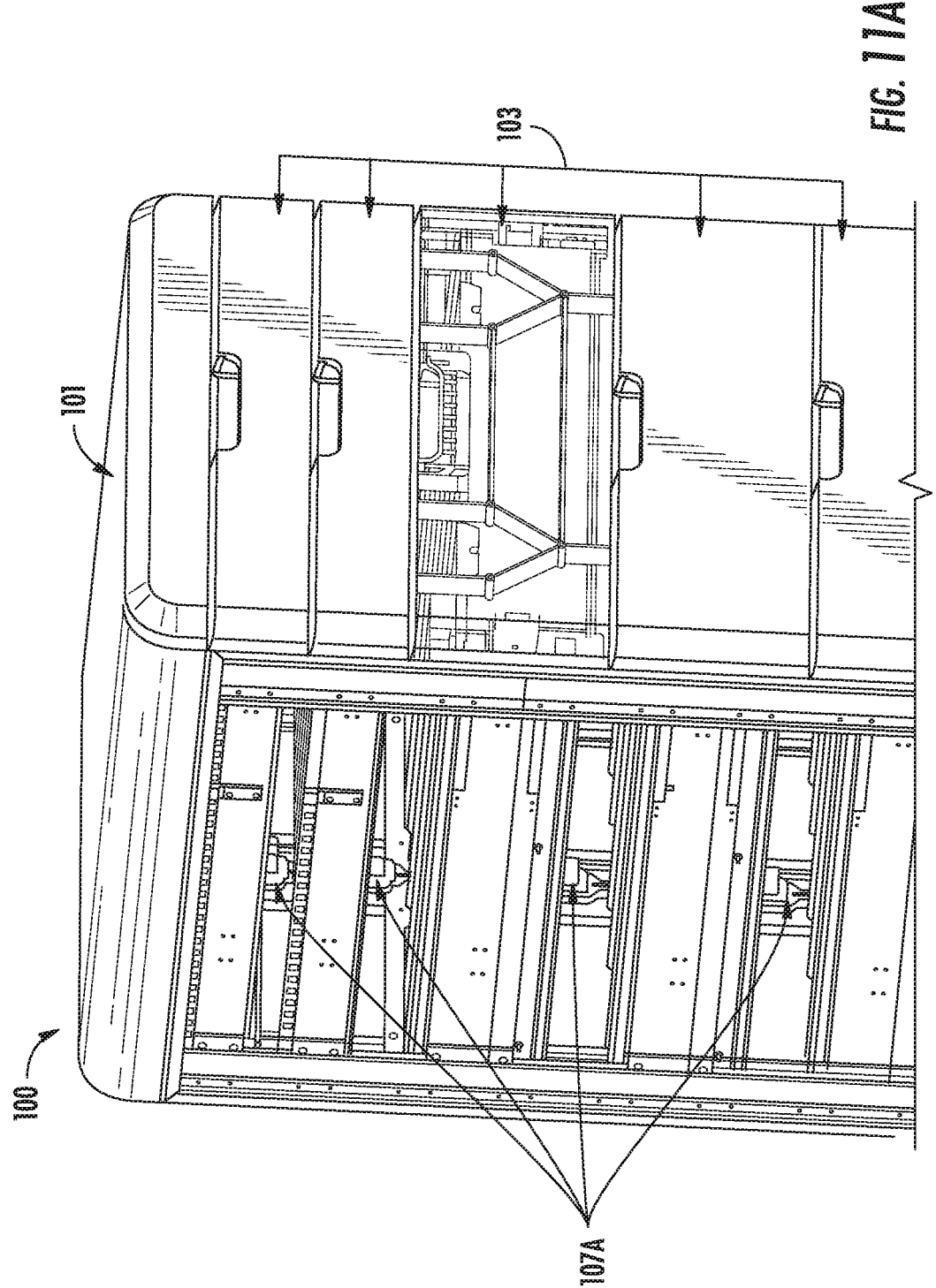
FIGS. 11A-11B are isometric views of a portion the automated product locker according to an implementation described herein.
Figure 11B:
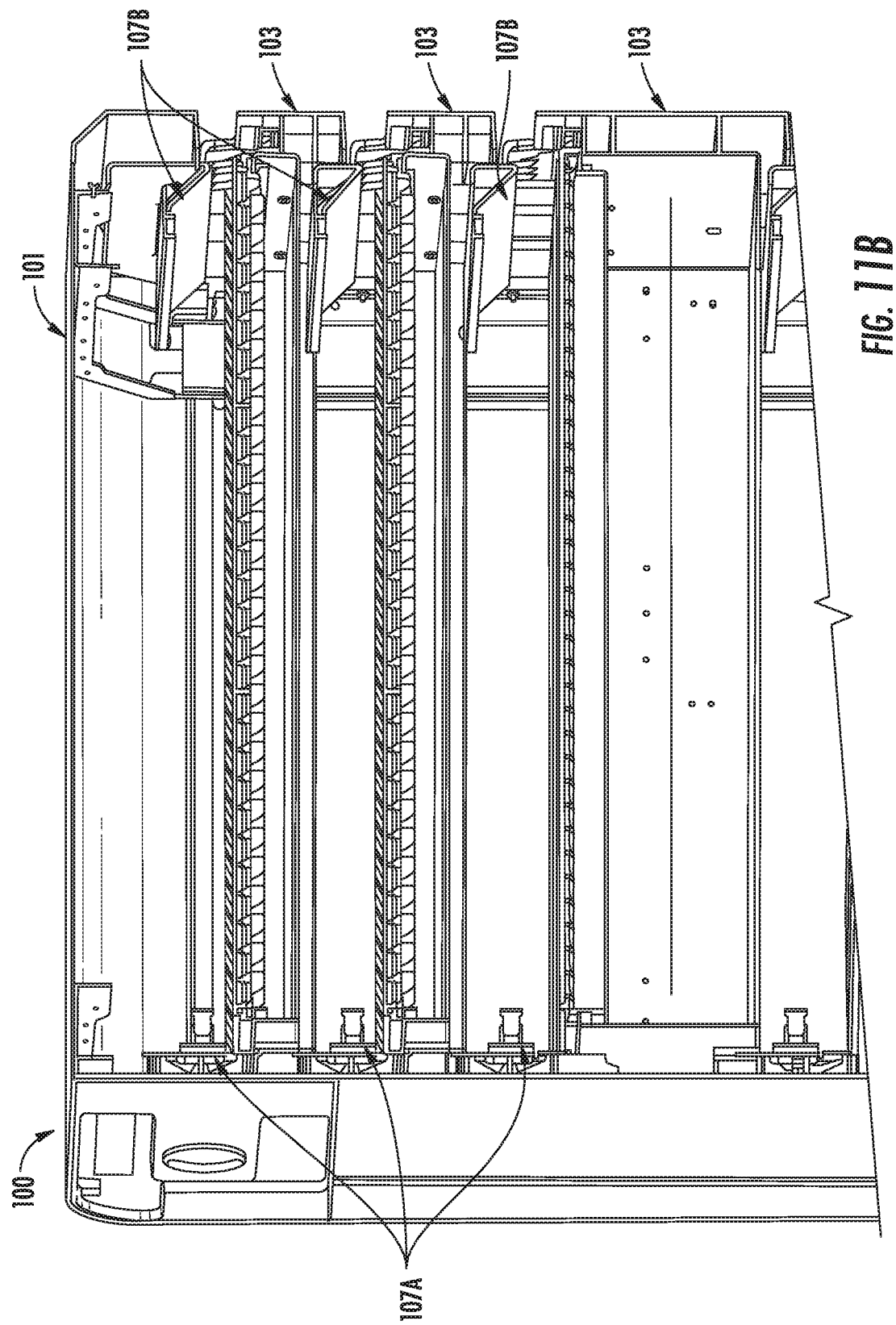

Referring now to FIGS. 11A-11B, isometric views of a portion the automated product locker 100 according to an implementation described herein are shown. The housing 101 and a plurality of drawers 103 are shown in FIGS. 11A-11B. FIG. 11A illustrates a view from the front of the automated product locker 100 without the side panel. One of the external drawer faces is transparent in FIG. 11A for visibility. FIG. 11B illustrates a view from the side of the automated product locker 100 without the side panel. FIGS. 11A-11B show the machine vision system arranged in the housing 101. The machine vision system of FIGS. 11A-11B includes an optical device 107A and a light reflecting device 107B (collectively referred to as the "machine vision system" of FIGS. 11A-11B). The optical device 107A can be an imaging device such as a digital camera. One of many suitable cameras includes the E-Consystems model 3CAM_CU135_TC. A digital camera includes a lens, sensor, and image processor. Digital cameras are known in the art and are therefore not described in further detail below. Additionally, the light reflecting device 107B can be configured to direct light reflected from at least a portion of the storage area to the optical device 107A. For example, light reflecting devices include, but are not limited to, mirrors, prisms, lenses, etc. As shown in FIGS. 11A-11B, the optical device 107A and the light reflecting device 107B are arranged at opposite sides of the drawer 103. The light reflecting device 107B is arranged at an angle such that the light reflecting surface is directed downward relative to an axis of the optical device 107A. In this way, the light reflecting surface 107B directs light reflected from a portion of the storage area of the drawer toward the optical device 107A, which allows the optical device 107A to capture images of the units of product within the storage area. It should be understood that the characteristics, size, and/or arrangement of the optical device 107A and light reflecting device 107B depend on the desired image field. This disclosure contemplates that one or more optical devices 107A and/or one or more light reflecting surfaces 107B can form the machine vision system. As discussed above, this is determined by the desired image field. Additionally, this disclosure contemplates that the machine vision system can include only one or more optical devices 107A (i.e., without light reflecting surfaces 107B). This depends, for example, on the size of the storage area, optical device characteristics, number of optical devices, etc.

Figure 12:
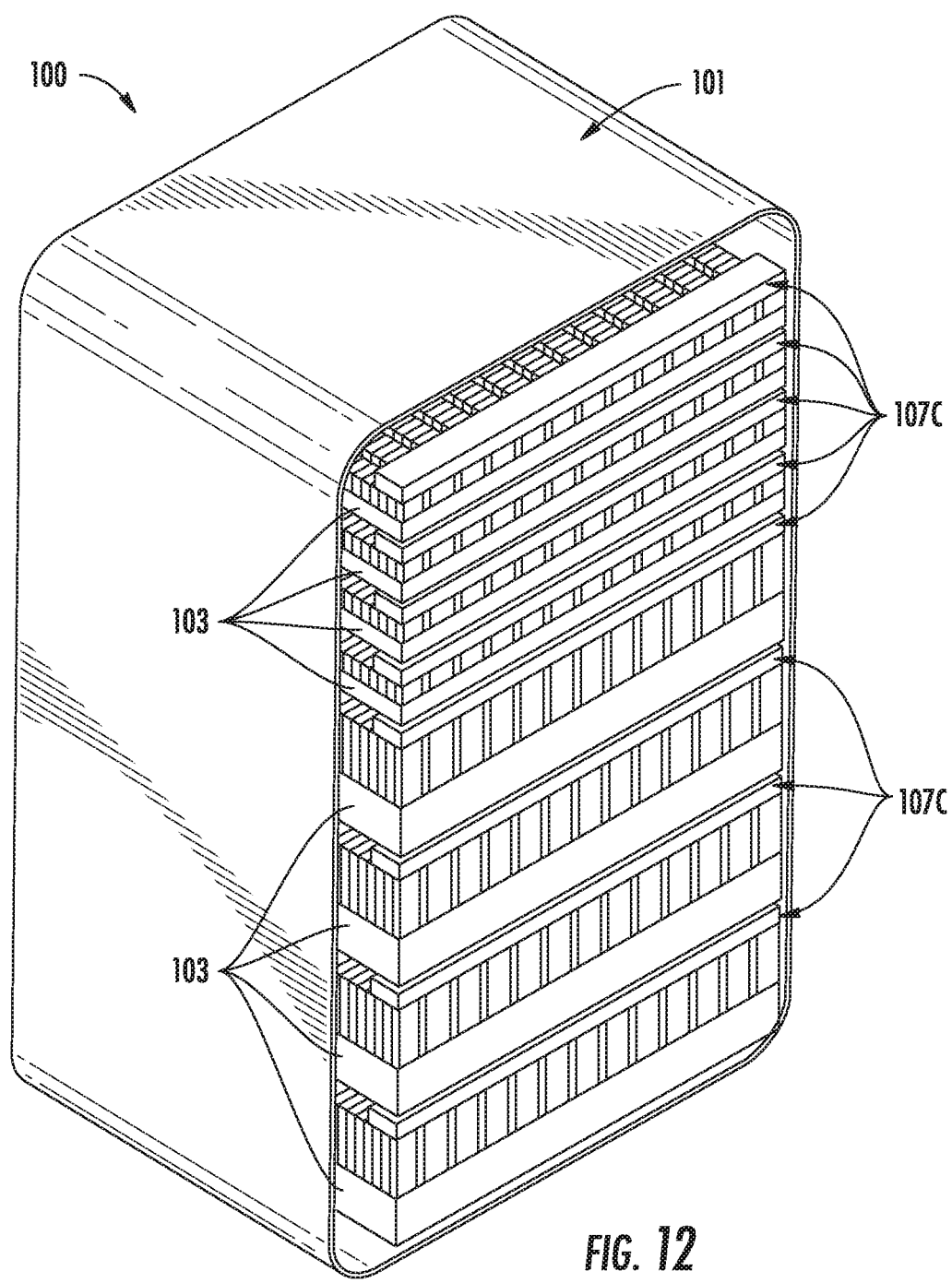
FIG. 12 is an isometric view of the automated product locker according to an implementation described herein.

Referring now to FIG. 12, an isometric view of the automated product locker 100 according to an implementation described herein is shown. The housing 101 and a plurality of drawers 103 are shown in FIG. 12. FIG. 12 illustrates a view from the front of the automated product locker 100 without the external faces of the drawers 103. The machine vision system of FIG. 12 includes an optical device 107C. The optical device 107C can be a barcode scanner. Barcode scanners are capable of reading and outputting printed machine readable codes (e.g., barcodes) to a computing device. Barcode scanners include, but are not limited to, laser scanners, charged coupled device (CCD) scanners, and omnidirectional scanners. Barcode scanners are known in the art and are therefore not described in further detail below.

As described herein, the automated storage locker 100 can include a plurality of drawers and a plurality of machine vision systems. In some implementations, a respective machine vision system (e.g., the optical device 107A/light reflecting device 107B of FIGS. 11A-11B or the optical device 107C of FIG. 12) can be provided for each respective drawer. In other words, each drawer can have its own machine vision system. Optionally, in some implementations, the machine vision system 107 can include a single optical device (e.g., one camera per drawer as shown in FIGS. 11A-11B).

Referring again to FIG. 2, the controller 109 can be configured to inventory the product based, at least in part, on the information about the product, and cause one or more of the visual indicators 105 that are associated with a desired unit of the product to actuate. An example process is now described with regard to FIGS. 13A-13D. In FIG. 13A, a user (e.g., ECP) enters a request for a desired unit of product using the client device 102. The client device 102 can transmit the request for the desired unit of the product to the automated product locker 100 via a network (not shown in FIGS. 13A-13D). A controller (not shown in FIGS. 13A-13D) of the automated product locker 100 can be configured to receive a request for the desired unit of the product. Additionally, the controller can be further configured to transmit the request for the desired unit of the product over the network to a remote system (not shown in FIGS. 13A-13D). As described herein, the remote system (e.g., remote system 104 in FIG. 1) can include and/or access an inventory database. The remote system can query the database to determine the position(s) of the desired unit(s) of product within the automated product locker 100. The remote system can transmit a response to the controller over the network, and the controller can receive the response, which includes position(s) of the desired unit(s) of product within the storage area. It should be understood that such position(s) can include specific drawer(s) and/or particular position(s) within the drawer(s). As described herein, the controller can be configured to transmit signals to actuate visual indicators (not shown in FIGS. 13A-13D) to assist the user in identifying the position(s) of the desired unit(s) of product within the drawer 103. Optionally, as described herein, the controller can unlock the drawer 103. The open drawer 103 is shown in FIGS. 13B and 13C, which also illustrates the visual indicators 105 that have been actuated (e.g., illuminated) by the controller. These visual indicators highlight the locations of the desired units of the product for the benefit of the user. In FIG. 13D, the drawer 103 is returned to the housing. As described herein, this movement (e.g., withdrawal of the drawer 103 from the housing 101 and/or return of the drawer 103 into the housing 101) can be detected by the automated product locker 100, e.g., using the machine vision system and/or a position detector. This causes the controller to initiate the machine vision system. By initiating the machine vision system, the automated product locker 100 can read/decode the machine-readable labels (e.g., barcodes, UPC, SKU, text, graphics) associated with the units of the product. The respective units of the product can then be associated with respective positions within the storage area. The respective positions for each of the units of product can then be transmitted by the controller to the remote system. In other words, the controller can be configured to transmit the updated inventory of the product over the network to the remote system, and the database can be updated accordingly. Optionally, as described herein, the controller can lock the drawer 103.

Alternatively or additionally, the automated product locker 100 can be restocked effortlessly. For example, the user (e.g., ECP) can open one or more drawers and restock product by placing the product packages in any empty slots in the storage area. Unlike conventional storage system, there is no need to organize the storage in any manner, for example, by prescription, power, type, etc. The product packages can instead be placed at random in the storage area. Upon closing a drawer, the controller can initiate the machine vision system. By initiating the machine vision system, the automated product locker 100 can read/decode the machine-readable labels (e.g., barcodes, UPC, SKU, text, graphics) associated with the units of the product. The respective units of the product can then be associated with respective positions within the storage area. The respective positions for each of the units of product can then be transmitted by the controller to the remote system. In other words, the controller can be configured to transmit the updated inventory of the product over the network to the remote system, and the database can be updated accordingly.

Referring again to FIG. 2, in some implementations, the controller 109 can be configured to provide an alarm in response to a condition of the drawer 103. A host of conditions could serve to trigger an alarm, including product being inserted incorrectly, such as upside down (as recognized by the computer vision system). As another possible alarm condition, the controller 109 may provide an alarm in response to the drawer 103 being left open (e.g., ajar) for longer than a preset period of time, e.g., to inform the user. Additionally, the controller 109 can provide an alarm in response to environmental conditions (e.g., temperature, humidity, etc.) within the storage area. This disclosure contemplates that the drawer 103 can include various sensors for detecting the environmental conditions.

As described herein, the optical device 107C of the machine vision system 107 can be a barcode scanner (see FIG. 12), which is capable of reading and decoding machine readable product identifiers such as a 1D barcode, a UPC, or an SKU. The machine readable product identifiers can be affixed to and/or printed directly on the product packages and/or the product itself as described herein. Accordingly, the step of inventorying the product based, at least in part, on the information about the product can include reading respective product identifiers associated with respective units of the product using the barcode scanner, and also decoding the respective product identifiers associated with the respective units of the product. After reading/decoding the respective product identifiers, it is possible to associate the respective units of the product with the respective positions within the storage area. This disclosure contemplates performing this association with either the controller 109 and/or the remote system (e.g., remote system 104 of FIG. 1).

As described herein, the optical device 107A of the machine vision system 107 can be an imaging device such as a digital camera (see FIGS. 11A-11B), which is capable of capturing images of machine readable product identifiers such as a 1D barcode, a 2D barcode, a 3D barcode, a UPC, or an SKU. An imaging device is also capable of capturing images of text and/or a graphics, which can serve as machine readable product identifiers. For example, text and/or graphics can include, but are not limited to, brand name, product name, product description, logo, etc. In these implementations, image processing techniques can be used to decode the machine readable product identifiers. Accordingly, the step of inventorying the product based, at least in part, on the information about the product can include receiving images of the product captured by the imaging device, analyzing the images of the product to identify respective product identifiers associated with respective units of the product, decoding the respective product identifiers associated with the respective units of the product. After analyzing/decoding the respective product identifiers, it is possible to associate the respective units of the product with the respective positions within the storage area. This disclosure contemplates performing this association with either the controller 109 and/or the remote system (e.g., remote system 104 of FIG. 1).

Optionally, in some implementations using an imaging device, the step of inventorying the product based, at least in part, on the information about the product further includes cropping a portion of the images of the product. By cropping the images, it is possible to focus on the portion of the image expected to contain the product identifiers. Thus, the cropped portion of the images is analyzed to identify the respective product identifiers associated with the respective units of the product. Additionally, the controller 109 can be configured to transmit the images of the product over a network to a remote system (e.g. remote system 104 in FIG. 1). In these implementations, the images can be stored by the remote system for back up purposes, or image processing (some or all) can be offloaded from the controller 109 to the remote system. Alternatively or additionally, the controller 109 can be configured to store the images of the product in the memory. In some implementations, the images can be stored only temporarily (e.g., to allow for image processing) and then written over to minimize the storage requirements at the automated product locker 100.

Optionally, in some implementations using an imaging device, the step of inventorying the product based, at least in part, on the information about the product further includes analyzing the images of the product to identify one or more of the respective positions within the storage area associated with a missing, unrecognized, or unreadable product identifier. Optionally, the controller 109 can be configured to distinguish between missing units of product and units of product having unrecognized/unreadable product identifiers. It should be understood that the former may be restocked, while the latter may be repositioned (e.g., flipped over, turned over, relabeled) to correctly orient the product identifier for reading by the machine vision system. For example, a machine learning algorithm can be used to determine whether one or more of the respective positions within the storage area associated with the missing, unrecognized, or unreadable product identifier contain a unit of the product. This disclosure contemplates that the machine learning algorithm can be executed by the controller 109 in some implementations using traditional vision systems (e.g., pattern recognition), while in other implementations the machine learning algorithm can be executed by the remote system (i.e., offloaded from the automated product locker 100). Machine learning algorithms can be trained using an existing dataset to perform a specific task such as identify missing, unrecognized, or unreadable product identifiers. Machine learning algorithms are known in the art and therefore not described in further detail below. An example machine learning algorithm is TensorFlow, which is an open source machine learning algorithm known in the art. TensorFlow is only one example machine learning algorithm. This disclosure contemplates using other machine learning algorithms including, but not limited to, neural networks, support vector machines, nearest neighbor algorithms, supervised learning algorithms, unsupervised learning algorithms.

Optionally, in some implementations using an imaging device, the step of inventorying the product based, at least in part, on the information about the product further includes analyzing the images of the product to determine, using a machine learning algorithm, a source of each of the respective units of the product. This is particularly useful when, for example, the product is sourced from multiple vendors or manufacturers. In other words, the automated product locker 100 can be used to store product from different sources (e.g., contact lenses from different manufacturers). As described above, the machine vision system 107 including an imaging device such as a camera can be used to capture images of both machine readable codes (barcodes, UPC, SKU) and text and graphics, and then imaging processing techniques can be used to decode the product identifiers. This disclosure contemplates that a machine learning algorithm can be used to identify machine readable codes associated with different vendors or manufacturers. This allows the automated product locker 100 to select the appropriate decoding rules. Alternatively or additionally, a machine learning algorithm can be used to identify the source of a unit of product based on text and/or graphics (even in the absence of machine readable codes). This disclosure contemplates that the machine learning algorithm can be executed by the controller 109 in some implementations, while in other implementations the machine learning algorithm can be executed by the remote system (i.e., offloaded from the automated product locker). Machine learning algorithms can be trained using an existing dataset to perform a specific task such as identify the source of units of the product. Machine learning algorithms are known in the art and therefore not described in further detail below. Example machine learning algorithms are provided above.

It should be appreciated that the logical operations described herein with respect to the various figures may be implemented (1) as a sequence of computer implemented acts or program modules (i.e., software) running on a computing device (e.g., the computing device described in FIG. 14), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 14:
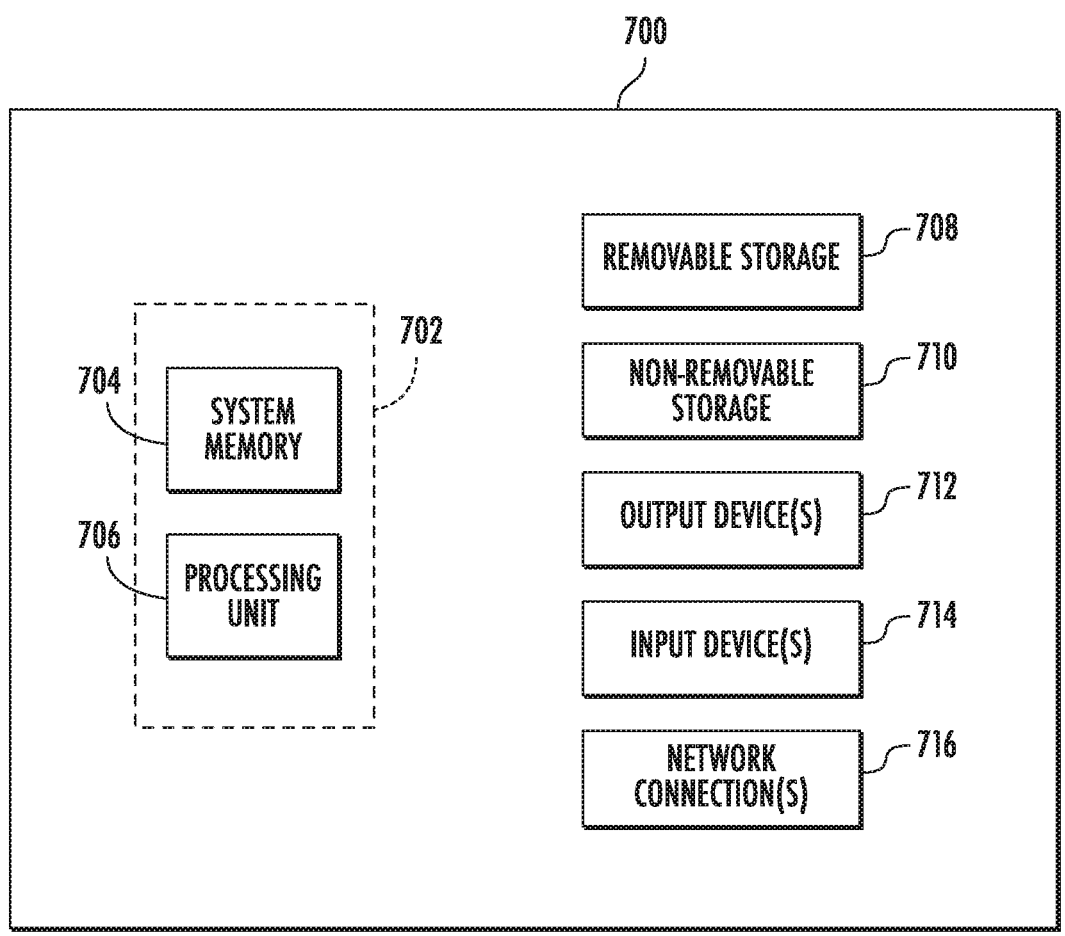
FIG. 14 is a block diagram of an example computing device.

Referring to FIG. 14, an example computing device 700 upon which the methods described herein may be implemented is illustrated. It should be understood that the example computing device 700 is only one example of a suitable computing environment upon which the methods described herein may be implemented. Optionally, the computing device 700 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 700 typically includes at least one processing unit 706 and system memory 704. Depending on the exact configuration and type of computing device, system memory 704 may be volatile (such as random access memory (RAM)), non-volatile (such as read-only memory (ROM), flash memory, etc.), or some combination of the two. This most basic configuration is illustrated in FIG. 14 by dashed line 702. The processing unit 706 may be a standard programmable processor that performs arithmetic and logic operations necessary for operation of the computing device 700. The computing device 700 may also include a bus or other communication mechanism for communicating information among various components of the computing device 700.

Computing device 700 may have additional features/functionality. For example, computing device 700 may include additional storage such as removable storage 708 and non-removable storage 710 including, but not limited to, magnetic or optical disks or tapes. Computing device 700 may also contain network connection(s) 716 that allow the device to communicate with other devices. Computing device 700 may also have input device(s) 714 such as a keyboard, mouse, touch screen, etc. Output device(s) 712 such as a display, speakers, printer, etc. may also be included. The additional devices may be connected to the bus in order to facilitate communication of data among the components of the computing device 700. All these devices are well known in the art and need not be discussed at length here.

The processing unit 706 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 706 for execution. Example tangible, computer-readable media may include, but is not limited to, volatile media, non-volatile media, removable media and non-removable media implemented in any method or technology for storage of information such as computer readable instructions, data structures, program modules or other data. System memory 704, removable storage 708, and non-removable storage 710 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 706 may execute program code stored in the system memory 704. For example, the bus may carry data to the system memory 704, from which the processing unit 706 receives and executes instructions. The data received by the system memory 704 may optionally be stored on the removable storage 708 or the non-removable storage 710 before or after execution by the processing unit 706.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An automated product locker, comprising:
   a housing;
   a drawer configured to be slidably stowable within the housing, the drawer defining a storage area comprising a plurality of slots configured to house a plurality of different products such that the plurality of different products may be placed at random in the storage area;
   a plurality of visual indicators configured to indicate respective positions of respective units of the products within the storage area;
   a machine vision system arranged within the housing and configured to capture information about the products; and
   a controller arranged within the housing and operably coupled to the machine vision system, the controller comprising a processor and a memory, the memory having computer-executable instructions stored thereon that, when executed by the processor, cause the controller to:
      detect an opening or closing of the drawer by a user, and, upon detecting the opening or closing to:
         (i) cause the camera to capture at least one image of the products, wherein the at least one image comprises information about the products; and
         (ii) inventory the products based, at least in part, on the information about the products, wherein inventorying the product based, at least in part, on the information about the product comprises:
- receiving images of the products captured by the camera;
- analyzing the images of the products to identify respective product identifiers associated with respective units of the product or an absence of product previously stored in the housing;
- decoding the respective product identifiers associated with the respective units of the products; and
- using the respective product identifiers, associating the respective units of the product with the respective positions within the storage area;
- determining a product inventory update based on the respective product identifiers or the absence of product previously stored in the housing;
- causing the controller to transmit the product inventory update over a network to a database of a remote system; and
- cause one or more of the visual indicators that are associated with a desired unit of the products to actuate; and
- wherein inventorying the products based, at least in part, on the information about the products further comprises analyzing the images of the products to determine, using a machine learning algorithm, a source of each of the respective units of the products.

2. The automated product locker of claim 1, wherein the drawer comprises an external face, and wherein at least one of the visual indicators is arranged on or adjacent to the external face.

3. The automated product locker of claim 1, wherein the drawer further comprises a plurality of partitions arranged within the storage area, and wherein a respective set of the visual indicators is arranged along each of the partitions.

4. The automated product locker of claim 3, wherein the drawer further comprises a plurality of trays configured to receive the product, wherein each of the trays is arranged between adjacent partitions.

5. The automated product locker of claim 4, wherein the plurality of slots reside within the trays.

6. The automated product locker of claim 1, wherein the optical device is a barcode scanner.

7. The automated product locker of claim 6, wherein inventorying the product based, at least in part, on the information about the product comprises:
- reading respective product identifiers associated with respective units of the products;
- decoding the respective product identifiers associated with the respective units of the products; and
- using the respective product identifiers, associating the respective units of the products with the respective positions within the storage area.

8. The automated product locker of claim 7, wherein each of the respective product identifiers is a one-dimensional (1D) barcode, a universal product code (UPC), or a stock keeping unit (SKU).

9. The automated product locker of claim 1, wherein each of the respective product identifiers is a one-dimensional (1D) barcode, a two-dimensional (2D) barcode, a three-dimensional (3D) barcode, a universal product code (UPC), a stock keeping unit (SKU), text, or a graphic.

10. The automated product locker of claim 1, wherein inventorying the products based, at least in part, on the information about the products further comprises analyzing the images of the products to identify one or more of the respective positions within the storage area associated with a missing, unrecognized, or unreadable product identifier.

11. The automated product locker of claim 10, wherein the memory has further computer-executable instructions stored thereon that, when executed by the processor, cause the controller to determine, using a machine learning algorithm, whether the one or more of the respective positions within the storage area associated with the missing, unrecognized, or unreadable product identifier contain a unit of the products.

12. The automated product locker of claim 1, wherein inventorying the products based, at least in part, on the information about the products further comprises cropping a portion of the images of the products, and wherein the cropped portion of the images is analyzed to identify the respective product identifiers associated with the respective units of the product.

13. The automated product locker of claim 1, wherein the memory has further computer-executable instructions stored thereon that, when executed by the processor, cause the controller to store the images of the products in the memory.

14. The automated product locker of claim 1, wherein the memory has further computer-executable instructions stored thereon that, when executed by the processor, cause the controller to transmit the images of the products over a network to a remote system.

15. The automated product locker of claim 1, wherein the memory has further computer-executable instructions stored thereon that, when executed by the processor, cause the controller to initiate the machine vision system in response to a movement of the drawer.

16. The automated product locker of claim 15, wherein the movement of the drawer is withdrawal of the drawer from the housing followed by return of the drawer into the housing.

17. The automated product locker of claim 15, further comprising a position detector configured to sense a position of the drawer relative to the housing.

18. The automated product locker of claim 17, wherein the position detector is a through-beam photoelectric sensor.

19. The automated product locker of claim 15, further comprising a position strip including machine readable code arranged within the drawer, wherein the machine vision system is further configured to capture information about the position strip, and wherein the memory has further computer-executable instructions stored thereon that, when executed by the processor, cause the controller to detect the movement of the drawer based, at least in part, on the information about the position strip.

20. The automated product locker of claim 1, wherein the memory has further computer-executable instructions stored thereon that, when executed by the processor, cause the controller to receive a request for the desired unit of the products.

21. The automated product locker of claim 20, wherein the memory has further computer-executable instructions stored thereon that, when executed by the processor, cause the controller to:
- transmit the request for the desired unit of the products over a network to a remote system; and
- receive a response from the remote system, the response including a position of the desired unit of products within the storage area.

22. The automated product locker of claim 21, wherein the remote system comprises a database.

23. The automated product locker of claim 1, wherein the memory has further computer-executable instructions stored thereon that, when executed by the processor, cause the controller to provide an alarm in response to a condition of the drawer.

24. The automated product locker of claim 1, further comprising a power supply arranged in the housing.

25. The automated product locker of claim 1, further comprising a locking device arranged in the housing and configured to secure the drawer.

26. The automated product locker of claim 1, wherein the machine vision system comprises a single optical device.

27. The automated product locker of claim 1, further comprising:
a plurality of drawers, each of the drawers being configured to be slidably stowable within the housing; and
a plurality of machine vision systems arranged within the housing, wherein a respective one of the machine vision systems corresponds to a respective one of the drawers.

28. The automated product locker of claim 1, wherein each of the visual indicators is at least one of a light emitter or a graphical display.

29. The automated product locker of claim 1, wherein each of the respective units of the products is a product package.

30. The automated product locker of claim 29, wherein the product package includes one or more contact lenses.

31. The automated product locker of claim 1, wherein at least one of the visual indicators is configured display a first user indication associated with a first user and a second user indication associated with a second user, wherein first user indication and the second user indication may be selected from an icon, image, or a color associated with a particular user.

* * * * *